(12) United States Patent
Walker et al.

(10) Patent No.: US 9,314,952 B2
(45) Date of Patent: Apr. 19, 2016

(54) IRRIGATION SPRAY NOZZLE AND MOLD ASSEMBLY AND METHOD OF FORMING NOZZLE

(71) Applicant: Rain Bird Corporation, Azusa, CA (US)

(72) Inventors: Samuel C. Walker, Green Valley, AZ (US); Vahik Nazaryan, Azusa, CA (US)

(73) Assignee: Rain Bird Corporation, Azusa, CA (US)

( * ) Notice: Subject to any disclaimer, the term of this patent is extended or adjusted under 35 U.S.C. 154(b) by 82 days.

(21) Appl. No.: 13/829,875

(22) Filed: Mar. 14, 2013

(65) Prior Publication Data

US 2014/0263757 A1 Sep. 18, 2014

(51) Int. Cl.
| | |
|---|---|
| *B05B 1/26* | (2006.01) |
| *B29C 45/26* | (2006.01) |
| *B29C 45/33* | (2006.01) |
| *B29C 45/44* | (2006.01) |

(52) U.S. Cl.
CPC ............. *B29C 45/2628* (2013.01); *B05B 1/267* (2013.01); *B29C 45/33* (2013.01); *B29C 45/44* (2013.01); *B29C 2045/4485* (2013.01)

(58) Field of Classification Search
CPC ........ A01G 25/00; B05B 1/262; B05B 1/265; B05B 1/267; B05B 1/185
USPC ........................... 239/498, 500, 497, 522, 523
See application file for complete search history.

(56) References Cited

U.S. PATENT DOCUMENTS

| | | | |
|---|---|---|---|
| 458,607 | A | 9/1891 | Weiss |
| 691,758 | A | 1/1902 | Gay |
| 949,520 | A | 2/1910 | Choate |
| 1,523,609 | A | 1/1922 | Roach |
| 1,432,386 | A | 10/1922 | Curney |
| 1,639,162 | A | 8/1927 | Brooks |
| 1,764,570 | A | 6/1930 | Lohman |
| 1,805,782 | A | 5/1931 | Munz |

(Continued)

FOREIGN PATENT DOCUMENTS

| | | |
|---|---|---|
| AU | 783999 | 1/2006 |
| CA | 2427450 | 6/2004 |

(Continued)

OTHER PUBLICATIONS

U.S. Appl. No. 12/757,912, filed Apr. 9, 2010.

(Continued)

*Primary Examiner* — Davis Hwu

(74) *Attorney, Agent, or Firm* — Fitch, Even, Tabin & Flannery, LLP

(57) ABSTRACT

A nozzle is provided having a low precipitation rate and uniform fluid distribution to a desired arcuate span of coverage. The nozzle has an inflow port having a shape corresponding to the desired arc of coverage and a size for effecting a low precipitation rate. The nozzle also has a deflector surface with a water distribution profile including ribs for subdividing the fluid into multiple sets of fluid streams. There are at least two fluid streams for distant and close-in irrigation to provide relatively uniform distribution and coverage. The nozzle may be a unitary, one-piece, molded nozzle body including a mounting portion, an inflow port, and a deflector portion. There is also provided a mold assembly and method for forming a unitary, one piece nozzle body.

33 Claims, 30 Drawing Sheets

(56) References Cited

U.S. PATENT DOCUMENTS

| | | |
|---|---|---|
| 1,964,269 A | 6/1934 | Munz |
| 2,125,863 A | 8/1938 | Arbogast |
| 2,125,978 A | 8/1938 | Arbogast |
| 2,128,552 A | 8/1938 | Rader |
| 2,130,810 A | 9/1938 | Munz |
| 2,325,280 A | 7/1943 | Scherrer |
| 2,348,776 A | 7/1943 | Scherrer |
| 2,338,273 A | 1/1944 | Wilkins |
| 2,634,163 A | 4/1953 | Double |
| 2,723,879 A | 11/1955 | Martin |
| 2,785,013 A | 3/1957 | Steams |
| 2,935,266 A | 6/1958 | Coleondro |
| 2,864,652 A | 12/1958 | O'Brien et al. |
| 2,875,783 A | 3/1959 | Schippers |
| 2,914,257 A | 3/1959 | Schippers |
| 2,990,123 A | 6/1961 | Hyde |
| 2,990,128 A | 6/1961 | Hyde |
| 3,029,030 A | 4/1962 | Dey, Sr. |
| 3,239,149 A | 3/1966 | Lindberg, Jr. |
| 3,365,137 A | 1/1968 | Corsette |
| 3,380,659 A | 4/1968 | Seablom |
| 3,716,192 A * | 2/1973 | Hunter ........................ 239/205 |
| 3,752,403 A | 8/1973 | Diest |
| 3,815,831 A | 6/1974 | Jooste |
| 3,940,066 A | 2/1976 | Hunter |
| 3,948,285 A | 4/1976 | Flynn |
| 3,955,764 A | 5/1976 | Phaup |
| 4,026,471 A | 5/1977 | Hunter |
| 4,119,275 A | 10/1978 | Hunter |
| 4,131,234 A | 12/1978 | Pescetto |
| 4,168,033 A | 9/1979 | Von Bernuth et al. |
| 4,189,099 A | 2/1980 | Bruninga |
| 4,198,000 A | 4/1980 | Hunter |
| 4,253,608 A | 3/1981 | Hunter |
| 4,272,024 A | 6/1981 | Kah, Jr. |
| 4,316,579 A | 2/1982 | Ray |
| 4,353,506 A | 10/1982 | Hayes |
| 4,353,507 A | 10/1982 | Kah, Jr. |
| 4,398,666 A | 8/1983 | Hunter |
| 4,401,273 A | 8/1983 | Olson |
| 4,417,691 A | 11/1983 | Lockwood |
| 4,456,181 A | 6/1984 | Burnham |
| 4,471,908 A | 9/1984 | Hunter |
| 4,479,611 A | 10/1984 | Galvis |
| 4,501,391 A | 2/1985 | Hunter |
| 4,566,632 A | 1/1986 | Sesser |
| 4,568,024 A | 2/1986 | Hunter |
| 4,579,284 A | 4/1986 | Arnold |
| 4,579,285 A | 4/1986 | Hunter |
| 4,609,146 A | 9/1986 | Walto |
| 4,618,100 A | 10/1986 | White et al. |
| 4,624,412 A | 11/1986 | Hunter |
| 4,625,917 A | 12/1986 | Torney |
| RE32,386 E | 3/1987 | Hunter |
| 4,660,766 A | 4/1987 | Nelson |
| 4,669,663 A | 6/1987 | Meyer |
| 4,676,438 A | 6/1987 | Sesser |
| 4,681,260 A | 7/1987 | Cochran |
| 4,681,263 A | 7/1987 | Cockman |
| 4,682,732 A | 7/1987 | Walto |
| 4,699,321 A | 10/1987 | Bivens |
| 4,708,291 A | 11/1987 | Grundy |
| 4,718,605 A | 1/1988 | Hunter |
| 4,720,045 A | 1/1988 | Meyer |
| 4,739,934 A | 4/1988 | Gewelber |
| D296,464 S | 6/1988 | Marmol |
| 4,752,031 A | 6/1988 | Merrick |
| 4,760,958 A | 8/1988 | Greenberg |
| 4,763,838 A | 8/1988 | Holcomb |
| 4,784,325 A | 11/1988 | Walker et al. |
| 4,796,809 A | 1/1989 | Hunter |
| 4,796,811 A | 1/1989 | Davisson |
| 4,815,662 A | 3/1989 | Hunter |
| 4,834,289 A | 5/1989 | Hunter |
| 4,836,449 A | 6/1989 | Hunter |
| 4,836,450 A | 6/1989 | Hunter |
| 4,840,312 A | 6/1989 | Tyler |
| 4,842,201 A | 6/1989 | Hunter |
| 4,867,378 A | 9/1989 | Kah |
| 4,889,287 A | 12/1989 | Hemsley et al. |
| 4,898,332 A | 2/1990 | Hunter |
| 4,901,924 A | 2/1990 | Kah |
| 4,932,590 A | 6/1990 | Hunter |
| 4,944,456 A | 7/1990 | Zakai |
| 4,948,052 A | 8/1990 | Hunter |
| 4,955,542 A | 9/1990 | Kah |
| 4,961,534 A | 10/1990 | Tyler |
| 4,967,961 A | 11/1990 | Hunter |
| 4,971,250 A | 11/1990 | Hunter |
| D312,865 S | 12/1990 | Davisson |
| 4,986,474 A | 1/1991 | Schisler |
| 5,031,840 A | 7/1991 | Grundy |
| 5,050,800 A | 9/1991 | Lamar |
| 5,052,621 A | 10/1991 | Katzer |
| 5,058,806 A | 10/1991 | Rupar |
| 5,078,321 A | 1/1992 | Davis |
| 5,083,709 A | 1/1992 | Iwanowski |
| RE33,823 E | 2/1992 | Nelson |
| 5,086,977 A | 2/1992 | Kah, Jr. |
| 5,090,619 A | 2/1992 | Barthold et al. |
| 5,098,021 A | 3/1992 | Kah |
| 5,104,045 A | 4/1992 | Kah |
| 5,123,597 A | 6/1992 | Bendall |
| 5,141,024 A | 8/1992 | Hicks |
| 5,148,990 A | 9/1992 | Kah, Jr. |
| 5,148,991 A | 9/1992 | Kah |
| 5,152,458 A | 10/1992 | Curtis |
| 5,158,232 A | 10/1992 | Tyler |
| 5,174,327 A | 12/1992 | Truax |
| 5,174,501 A | 12/1992 | Hadar |
| 5,199,646 A | 4/1993 | Kah |
| 5,205,491 A | 4/1993 | Hadar |
| 5,224,653 A | 7/1993 | Nelson |
| 5,226,599 A | 7/1993 | Lindermeir |
| 5,226,602 A | 7/1993 | Cochran |
| 5,234,169 A | 8/1993 | McKenzie |
| 5,240,182 A | 8/1993 | Lemme |
| 5,240,184 A | 8/1993 | Lawson |
| 5,267,689 A | 12/1993 | Forer |
| 5,288,022 A | 2/1994 | Sesser |
| 5,299,742 A | 4/1994 | Han |
| 5,322,223 A | 6/1994 | Hadar |
| 5,335,857 A | 8/1994 | Hagon |
| 5,360,167 A | 11/1994 | Crundy |
| 5,370,311 A | 12/1994 | Chen |
| 5,372,307 A | 12/1994 | Sesser |
| 5,375,768 A | 12/1994 | Clark |
| 5,398,872 A | 3/1995 | Joubran |
| 5,417,370 A | 5/1995 | Kah |
| 5,423,486 A | 6/1995 | Hunter |
| 5,435,490 A | 7/1995 | Machut |
| 5,439,174 A | 8/1995 | Sweet |
| RE35,037 E | 9/1995 | Kah |
| 5,456,411 A | 10/1995 | Scott |
| 5,503,139 A | 4/1996 | McMahon |
| 5,526,982 A | 6/1996 | McKenzie |
| 5,544,814 A | 8/1996 | Spenser |
| 5,556,036 A | 9/1996 | Chase |
| 5,588,594 A | 12/1996 | Kah, Jr. |
| 5,588,595 A | 12/1996 | Sweet |
| 5,598,977 A | 2/1997 | Lemme |
| 5,611,488 A | 3/1997 | Frolich |
| 5,620,141 A | 4/1997 | Chiang |
| 5,640,983 A | 6/1997 | Sherman, Jr. |
| 5,642,861 A | 7/1997 | Ogi et al. |
| 5,653,390 A | 8/1997 | Kah |
| 5,662,545 A | 9/1997 | Zimmerman |
| 5,671,885 A | 9/1997 | Davisson |
| 5,671,886 A | 9/1997 | Sesser |
| 5,676,315 A | 10/1997 | Han |
| D388,502 S | 12/1997 | Kah |
| 5,695,123 A | 12/1997 | Le |
| 5,699,962 A | 12/1997 | Scott |
| 5,711,486 A | 1/1998 | Clark |

(56) References Cited

U.S. PATENT DOCUMENTS

| | | |
|---|---|---|
| 5,718,381 A | 2/1998 | Katzer |
| 5,720,435 A | 2/1998 | Hunter |
| 5,722,593 A | 3/1998 | McKenzie |
| 5,758,827 A | 6/1998 | Van Le |
| 5,762,270 A | 6/1998 | Kearby |
| 5,765,757 A | 6/1998 | Bendall |
| 5,765,760 A | 6/1998 | Kuo |
| 5,769,322 A | 6/1998 | Smith |
| 5,785,248 A | 7/1998 | Staylor |
| 5,820,029 A | 10/1998 | Marans |
| 5,823,439 A | 10/1998 | Hunter |
| 5,823,440 A | 10/1998 | Clark |
| 5,826,797 A | 10/1998 | Kah |
| 5,845,849 A | 12/1998 | Mitzlaff |
| 5,875,969 A | 3/1999 | Grundy |
| 5,918,812 A | 7/1999 | Beutler |
| 5,927,607 A | 7/1999 | Scott |
| 5,971,297 A | 10/1999 | Sesser |
| 5,988,523 A | 11/1999 | Scott |
| 5,992,760 A | 11/1999 | Kearby |
| 6,007,001 A | 12/1999 | Hilton |
| 6,019,295 A | 2/2000 | McKenzie |
| 6,029,907 A | 2/2000 | McKenzie |
| 6,042,021 A | 3/2000 | Clark |
| 6,050,502 A | 4/2000 | Clark |
| 6,076,744 A | 6/2000 | O'Brien |
| 6,076,747 A | 6/2000 | Ming-Yuan |
| 6,085,995 A | 7/2000 | Kah |
| 6,102,308 A | 8/2000 | Steingrass |
| 6,109,545 A | 8/2000 | Kah |
| 6,138,924 A | 10/2000 | Hunter |
| 6,145,758 A | 11/2000 | Ogi |
| 6,155,493 A | 12/2000 | Kearby et al. |
| 6,158,675 A | 12/2000 | Ogi |
| 6,182,909 B1 | 2/2001 | Kah |
| 6,186,413 B1 | 2/2001 | Lawson |
| 6,223,999 B1 | 5/2001 | Lemelshtrich |
| 6,227,455 B1 | 5/2001 | Scott |
| 6,230,988 B1 | 5/2001 | Chao |
| 6,230,989 B1 | 5/2001 | Haverstraw |
| 6,237,862 B1 | 5/2001 | Kah |
| 6,241,158 B1 | 6/2001 | Clark |
| 6,244,521 B1 | 6/2001 | Sesser |
| 6,264,117 B1 | 7/2001 | Roman |
| 6,286,767 B1 | 9/2001 | Hui-Chen |
| 6,332,581 B1 | 12/2001 | Chin |
| 6,336,597 B1 | 1/2002 | Kah |
| 6,341,733 B1 | 1/2002 | Sweet |
| 6,345,541 B1 | 2/2002 | Hendey |
| 6,367,708 B1 | 4/2002 | Olson |
| D458,342 S | 6/2002 | Johnson |
| 6,443,372 B1 | 9/2002 | Hsu |
| 6,454,186 B2 | 9/2002 | Haverstraw |
| 6,457,656 B1 | 10/2002 | Scott |
| 6,464,151 B1 | 10/2002 | Cordua |
| 6,478,237 B2 | 11/2002 | Kearby et al. |
| 6,488,218 B1 | 12/2002 | Townsend |
| 6,491,235 B1 | 12/2002 | Scott |
| 6,494,384 B1 | 12/2002 | Meyer |
| 6,499,672 B1 | 12/2002 | Sesser |
| 6,530,531 B2 | 3/2003 | Butler |
| 6,588,680 B2 | 7/2003 | Cameron et al. |
| 6,601,781 B2 | 8/2003 | Kah |
| 6,607,147 B2 | 8/2003 | Schneider |
| 6,622,940 B2 | 9/2003 | Huang |
| 6,637,672 B2 | 10/2003 | Cordua |
| 6,651,904 B2 | 11/2003 | Roman |
| 6,651,905 B2 | 11/2003 | Sesser |
| 6,688,539 B2 | 2/2004 | Griend |
| 6,695,223 B2 | 2/2004 | Beutler |
| 6,715,699 B1 | 4/2004 | Greenberg |
| 6,719,218 B2 | 4/2004 | Cool et al. |
| 6,732,952 B2 | 5/2004 | Kah |
| 6,736,332 B2 | 5/2004 | Sesser |
| 6,736,336 B2 | 5/2004 | Wong |
| 6,769,633 B1 | 8/2004 | Huang |
| 6,811,098 B2 | 11/2004 | Drechsel |
| 6,814,304 B2 | 11/2004 | Onofrio |
| 6,814,305 B2 | 11/2004 | Townsend |
| 6,817,543 B2 | 11/2004 | Clark |
| 6,820,825 B1 | 11/2004 | Wang |
| 6,827,291 B2 | 12/2004 | Townsend |
| 6,834,816 B2 | 12/2004 | Kah, Jr. |
| 6,840,460 B2 | 1/2005 | Clark |
| 6,848,632 B2 | 2/2005 | Clark |
| 6,854,664 B2 | 2/2005 | Smith |
| 6,869,026 B2 | 3/2005 | McKenzie |
| 6,871,795 B2 | 3/2005 | Anuskiewicz |
| 6,880,768 B2 | 4/2005 | Lau |
| 6,883,727 B2 | 4/2005 | De Los Santos |
| 6,921,030 B2 | 7/2005 | Renquist |
| 6,932,279 B2 | 8/2005 | Burcham |
| 6,942,164 B2 | 9/2005 | Walker |
| 6,945,471 B2 | 9/2005 | McKenzie |
| 6,957,782 B2 | 10/2005 | Clark |
| 6,997,393 B1 | 2/2006 | Angold |
| 7,017,831 B2 | 3/2006 | Santiago |
| 7,017,837 B2 | 3/2006 | Taketomi |
| 7,028,920 B2 | 4/2006 | Hekman |
| 7,028,927 B2 | 4/2006 | Mermet |
| 7,032,836 B2 | 4/2006 | Sesser |
| 7,032,844 B2 | 4/2006 | Cordua |
| 7,040,553 B2 | 5/2006 | Clark |
| 7,044,403 B2 | 5/2006 | Kah |
| 7,070,122 B2 | 7/2006 | Burcham |
| 7,090,146 B1 | 8/2006 | Ericksen et al. |
| 7,100,842 B2 | 9/2006 | Meyer |
| 7,104,472 B2 | 9/2006 | Renquist |
| 7,108,204 B2 | 9/2006 | Johnson |
| 7,111,795 B2 | 9/2006 | Thong |
| 7,143,957 B2 | 12/2006 | Nelson |
| 7,143,962 B2 | 12/2006 | Kah, Jr. |
| 7,152,814 B1 | 12/2006 | Schapper |
| 7,156,322 B1 | 1/2007 | Heitzman |
| 7,159,795 B2 | 1/2007 | Sesser |
| 7,168,634 B2 | 1/2007 | Onofrio |
| 7,232,081 B2 | 6/2007 | Kah, Jr. |
| 7,234,651 B2 | 6/2007 | Mousavi |
| 7,240,860 B2 | 7/2007 | Griend |
| 7,287,710 B1 | 10/2007 | Nelson et al. |
| 7,287,711 B2 | 10/2007 | Crooks |
| 7,293,721 B2 | 11/2007 | Roberts |
| 7,303,147 B1 | 12/2007 | Danner |
| 7,303,153 B2 | 12/2007 | Han |
| 7,322,533 B2 | 1/2008 | Grizzle |
| 7,337,988 B2 | 3/2008 | McCormick et al. |
| 7,389,942 B2 | 6/2008 | Kenyon |
| RE40,440 E | 7/2008 | Sesser |
| 7,392,956 B2 | 7/2008 | McKenzie |
| 7,429,005 B2 | 9/2008 | Schapper |
| 7,478,526 B2 | 1/2009 | McAfee et al. |
| 7,487,924 B2 | 2/2009 | Johnson |
| 7,533,833 B2 | 5/2009 | Wang |
| 7,562,833 B2 | 7/2009 | Perkins et al. |
| 7,581,687 B2 | 9/2009 | Feith |
| 7,584,906 B2 | 9/2009 | Lev |
| 7,597,273 B2 | 10/2009 | McAfee et al. |
| 7,597,276 B2 | 10/2009 | Hawkins |
| 7,607,588 B2 | 10/2009 | Nobili |
| 7,611,077 B2 | 11/2009 | Sesser |
| 7,621,467 B1 | 11/2009 | Garcia |
| 7,654,474 B2 | 2/2010 | Cordua |
| 7,686,235 B2 | 3/2010 | Roberts |
| 7,686,236 B2 | 3/2010 | Alexander |
| 7,703,706 B2 | 4/2010 | Walker |
| RE41,302 E | 5/2010 | Drechsel |
| D615,152 S | 5/2010 | Kah |
| 7,766,259 B2 | 8/2010 | Feith |
| 7,770,821 B2 | 8/2010 | Pinch |
| 7,780,093 B2 | 8/2010 | Johnson |
| D628,272 S | 11/2010 | Kah |
| 7,828,229 B2 | 11/2010 | Kah, Jr. |
| 7,850,094 B2 | 12/2010 | Richmond |
| 7,861,948 B1 | 1/2011 | Crooks |

(56) References Cited

U.S. PATENT DOCUMENTS

| | | | |
|---|---|---|---|
| D636,459 S | 4/2011 | Kah |
| 7,926,746 B2 | 4/2011 | Melton |
| 7,971,804 B2 | 7/2011 | Roberts |
| 8,006,919 B2 | 8/2011 | Renquist |
| 8,047,456 B2 | 11/2011 | Kah |
| 8,056,829 B2 | 11/2011 | Gregory |
| 8,074,897 B2 | 12/2011 | Hunnicutt |
| 8,205,811 B2 | 6/2012 | Cordua |
| 8,272,583 B2 | 9/2012 | Hunnicutt |
| 8,282,022 B2 | 10/2012 | Porter |
| 8,328,112 B2 | 12/2012 | Johnson |
| 8,336,788 B2 | 12/2012 | Perkins et al. |
| 2,075,589 A1 | 1/2014 | Walker |
| 8,651,400 B2 | 2/2014 | Walker |
| 8,695,900 B2 | 4/2014 | Hunnicutt |
| 8,783,582 B2 | 7/2014 | Robertson et al. |
| 2001/0023901 A1 | 9/2001 | Haverstraw |
| 2002/0070289 A1 | 6/2002 | Hsu |
| 2002/0130202 A1 | 9/2002 | Kah, Jr. |
| 2002/0153434 A1 | 10/2002 | Cordua |
| 2003/0006304 A1 | 1/2003 | Cool et al. |
| 2003/0015606 A1 | 1/2003 | Cordua |
| 2003/0042327 A1 | 3/2003 | Beutler et al. |
| 2003/0071140 A1 | 4/2003 | Roman |
| 2003/0075620 A1 | 4/2003 | Sesser |
| 2004/0108391 A1 | 6/2004 | Onofrio |
| 2004/0124261 A1 | 7/2004 | Griend |
| 2005/0006501 A1 | 1/2005 | Englefield |
| 2005/0161534 A1 | 7/2005 | Kah |
| 2005/0194464 A1 | 9/2005 | Bruninga |
| 2005/0194479 A1 | 9/2005 | Curtis |
| 2006/0038046 A1 | 2/2006 | Curtis |
| 2006/0086832 A1 | 4/2006 | Roberts |
| 2006/0086833 A1 | 4/2006 | Roberts |
| 2006/0108445 A1 | 5/2006 | Pinch |
| 2006/0144968 A1 | 7/2006 | Lev |
| 2006/0237198 A1 | 10/2006 | Crampton |
| 2006/0273202 A1 | 12/2006 | Su |
| 2006/0281375 A1 | 12/2006 | Jordan |
| 2007/0012800 A1 | 1/2007 | McAfee et al. |
| 2007/0034711 A1 | 2/2007 | Kah |
| 2007/0034712 A1 | 2/2007 | Kah |
| 2007/0181711 A1 | 8/2007 | Sesser |
| 2007/0235565 A1 | 10/2007 | Kah |
| 2007/0246567 A1 | 10/2007 | Roberts |
| 2008/0169363 A1 | 7/2008 | Walker |
| 2008/0217427 A1 | 9/2008 | Wang et al. |
| 2008/0257982 A1 | 10/2008 | Kah |
| 2008/0276391 A1 | 11/2008 | Jung |
| 2008/0277499 A1 | 11/2008 | McAfee et al. |
| 2009/0008484 A1 | 1/2009 | Feith |
| 2009/0014559 A1 | 1/2009 | Marino |
| 2009/0072048 A1 | 3/2009 | Renquist |
| 2009/0078788 A1 | 3/2009 | Holmes |
| 2009/0108099 A1 | 4/2009 | Porter |
| 2009/0140076 A1 | 6/2009 | Cordua |
| 2009/0173803 A1 | 7/2009 | Kah, Jr. |
| 2009/0173904 A1 | 7/2009 | Roberts |
| 2009/0188988 A1 | 7/2009 | Walker |
| 2009/0188991 A1 | 7/2009 | Russell et al. |
| 2009/0224070 A1 | 9/2009 | Clark |
| 2010/0078508 A1 | 4/2010 | South et al. |
| 2010/0090024 A1 | 4/2010 | Hunnicutt |
| 2010/0090036 A1 | 4/2010 | Allen et al. |
| 2010/0108787 A1 | 5/2010 | Walker |
| 2010/0155506 A1 | 6/2010 | Johnson |
| 2010/0176217 A1 | 7/2010 | Richmond |
| 2010/0257670 A1 | 10/2010 | Hodel |
| 2010/0276512 A1 | 11/2010 | Nies |
| 2010/0294851 A1 | 11/2010 | Johnson |
| 2010/0301135 A1 | 12/2010 | Hunnicutt |
| 2010/0301142 A1 | 12/2010 | Hunnicutt |
| 2011/0024522 A1 | 2/2011 | Anuskiewicz |
| 2011/0024526 A1 | 2/2011 | Feith et al. |
| 2011/0024809 A1 | 2/2011 | Janesick |
| 2011/0031325 A1 | 2/2011 | Perkins et al. |
| 2011/0031332 A1 | 2/2011 | Sesser et al. |
| 2011/0036920 A1 | 2/2011 | Johnson |
| 2011/0147484 A1 | 6/2011 | Jahan |
| 2011/0147489 A1 | 6/2011 | Walker et al. |
| 2011/0248093 A1 | 10/2011 | Kim |
| 2011/0248094 A1 | 10/2011 | Robertson et al. |
| 2011/0248097 A1 | 10/2011 | Kim |
| 2011/0285126 A1 | 11/2011 | Jahan et al. |
| 2011/0309161 A1 | 12/2011 | Renquist |
| 2012/0012670 A1 | 1/2012 | Kah |
| 2012/0153051 A1 | 6/2012 | Kah, Jr. |
| 2012/0292403 A1 | 11/2012 | Hunnicutt et al. |
| 2013/0334332 A1 | 12/2013 | Robertson |
| 2013/0334340 A1 | 12/2013 | Walker |
| 2014/0027526 A1 | 1/2014 | Shadbolt |
| 2014/0027527 A1 | 1/2014 | Walker |

FOREIGN PATENT DOCUMENTS

| | | |
|---|---|---|
| CN | 1016463 | 4/1992 |
| CN | 2794646 | 7/2006 |
| CN | 2805823 | 8/2006 |
| DE | 1283591 B | 11/1968 |
| DE | 3335805 A1 | 2/1985 |
| EP | 0761312 A1 | 12/1991 |
| EP | 463742 | 1/1992 |
| EP | 489679 | 6/1992 |
| EP | 518579 | 12/1992 |
| EP | 572747 | 12/1993 |
| EP | 646417 | 4/1995 |
| EP | 724913 | 8/1996 |
| EP | 1043075 | 10/2000 |
| EP | 1043077 | 10/2000 |
| EP | 1173286 | 1/2002 |
| EP | 1250958 | 10/2002 |
| EP | 1270082 | 1/2003 |
| EP | 1289673 | 3/2003 |
| EP | 1426112 | 6/2004 |
| EP | 1440735 | 7/2004 |
| EP | 1452234 | 9/2004 |
| EP | 1492626 | 1/2005 |
| EP | 1502660 | 2/2005 |
| EP | 1508378 | 2/2005 |
| EP | 1818104 | 8/2007 |
| EP | 1944090 | 7/2008 |
| EP | 2255884 A1 | 1/2010 |
| EP | 2251090 A2 | 11/2010 |
| GB | 1234723 | 6/1971 |
| GB | 2330783 | 5/1999 |
| SU | 62588 A1 | 11/1942 |
| WO | 9520988 | 8/1995 |
| WO | 9727951 | 8/1997 |
| WO | 9735668 | 10/1997 |
| WO | 0007428 | 12/2000 |
| WO | 0131996 | 5/2001 |
| WO | 0162395 | 8/2001 |
| WO | 02078857 | 10/2002 |
| WO | 02098570 | 12/2002 |
| WO | 03086643 | 10/2003 |
| WO | 2004052721 | 6/2004 |
| WO | 2005099905 | 10/2005 |
| WO | 2005115554 | 12/2005 |
| WO | 2005123263 | 12/2005 |
| WO | 2006108298 | 10/2006 |
| WO | 2007131270 | 11/2007 |
| WO | 2008130393 | 10/2008 |
| WO | 2009036382 | 3/2009 |
| WO | 2010036241 | 4/2010 |
| WO | 2010126769 | 11/2010 |
| WO | 2011075690 | 6/2011 |

OTHER PUBLICATIONS

Notification of Transmittal of the International Search Report and the Written Opinion of the International Searching Authority mailed Jul. 10, 2014 (7 pages).

Office Action dated Sep. 8, 2014 for U.S. Appl. No. 12/757,912.

(56) References Cited

OTHER PUBLICATIONS

USPTO; U.S. Appl. No. 12/757,912; Office Action dated May 14, 2015.
Advisory Action mailed Jul. 14, 2011 for U.S. Appl. No. 11/947,571 (3 pgs.).
Applicant-Initiated Interview Summary and Final Office Action mailed Mar. 5, 2014 for U.S. Appl. No. 12/972,271 (12 pgs.).
European Patent Office Search Report and Opinion dated Aug. 5, 2010 for Application No. 10164085.2 (5 pgs.).
Final Office Action mailed Apr. 5, 2011 for U.S. Appl. No. 11/947,571 (11 pgs.).
Final Office Action mailed Dec. 5, 2013 for U.S. Appl. No. 12/972,271 (9 pgs.).
Interview Summary mailed Mar. 5, 2014 for U.S. Appl. No. 12/859,159 (3 pgs.).
Interview Summary mailed Sep. 26, 2011 for U.S. Appl. No. 12/475,242 (3 pgs.).
Issue Notification mailed Jul. 2, 2014 for U.S. Appl. No. 12/859,159 (1 pg.).
Non-Final Office Action dated Jan. 10, 2014 for U.S. Appl. No. 13/069,334 (6 pgs.).
Non-Final Office Action mailed Apr. 10, 2013 for U.S. Appl. No. 13/562,825 (22 pgs.).
Non-Final Office Action mailed Aug. 24, 2010 for U.S. Appl. No. 11/947,571 (11 pgs.).
Non-Final Office Action mailed Dec. 4, 2012 for U.S. Appl. No. 12/686,895 (29 pgs.).
Non-Final Office Action mailed Jan. 5, 2011 for U.S. Appl. No. 12/248,644 (20 pgs.).
Non-Final Office Action mailed Jul. 20, 2011 for U.S. Appl. No. 12/475,242 (17 pgs.).
Non-Final Office Action mailed Jun. 5, 2013 for U.S. Appl. No. 12/972,271 (8 pgs.).
Non-Final Office Action mailed Jun. 7, 2012 for U.S. Appl. No. 13/300,946 (9 pgs.).
Non-Final Office Action mailed Mar. 29, 2011 for U.S. Appl. No. 12/475,242 (7 pgs.).
Non-Final Office Action mailed May 24, 2013 U.S. Appl. No. 12/720,261 (67 pgs.).
Non-Final Office Action mailed Oct. 12, 2012 for U.S. Appl. No. 13/300,946 (7 pgs.).
Non-Final Office Action mailed Oct. 15, 2012 for U.S. Appl. No. 13/562,825 (10 pgs.).
Non-Final Office Action mailed Sep. 3, 2013 for U.S. Appl. No. 13/300,946. (5 pgs.).
Non-Final Office Action mailed Sep. 30, 2010 for U.S. Appl. No. 12/248,644 (7 pgs.).
Notice of Allowability mailed Jun. 23, 2014 for U.S. Appl. No. 12/859,159 (6 pgs.).
Notice of Allowance mailed Mar. 14, 2014 for U.S. Appl. No. 12/859,159 (12 pgs.).
Office Action dated Apr. 1, 2014 for U.S. Appl. No. 13/069,334.
Office Action dated Oct. 7, 2014 for U.S. Appl. No. 13/523,846.
Office Action mailed Dec. 4, 2013 for U.S. Appl. No. 12/859,159 (12 pgs.).
Office Action mailed May 29, 2013 for U.S. Appl. No. 12/859,159; (19 pgs.)
Office Action mailed Oct. 30, 2014 for U.S. Appl. No. 13/069,334 (15 pgs.).
Response dated Apr. 29, 2011 to Office Action mailed Mar. 29, 2011 for U.S. Appl. No. 12/475,242 (13 pgs.).
Response dated Jun. 25, 2012 to Office Action mailed Jun. 7, 2012 for U.S. Appl. No. 13/300,946 (12 pgs.).
Response dated Mar. 4, 2014 to Final Office Action mailed Dec. 4, 2013 for U.S. Appl. No. 12/859,159 (19 pgs.).
Response dated Nov. 24, 2010 to Office Action mailed Aug. 24, 2010 for U.S. Appl. No. 11/947,571 (19 pgs.).
Response dated Oct. 18, 2011 to Office Action mailed Jul. 20, 2011 for U.S. Appl. No. 12/475,242 (17 pgs.).
Response dated Oct. 29, 2013 to Non-Final Office Action mailed May 29, 2013 for U.S. Appl. No. 12/859,159 (13 pgs.).
Response dated Sep. 16, 2013 to Office Action mailed Jun. 5, 2013 for U.S. Appl. No. 12/972,271 (15 pgs.).
U.S. Appl. No. 61/681,798, filed Aug. 10, 2012.
U.S. Appl. No. 61/681,802, filed Aug. 10, 2012.
USPTO; U.S. Appl. No. 13/069,334; Office Action mailed Apr. 27, 2015.
USPTO; U.S. Appl. No. 13/523,846; Notice of Allowance mailed Feb. 23, 2015.
Written Opinion of the International Searching Authority and International Search Report date of mailing Apr. 19, 2011 for Application No. PCT/US10/61132 (12 pgs.).
Response dated Feb. 10, 2014 to Office Action mailed Jan. 10, 2014 for U.S. Appl. No. 13/069,334 (3 pgs.).
EPO Search Report and Opinion, dated Aug. 5, 2010 for EPO Application No. 10164085.2 (5 pgs.).
Initiated Interview Summary and Non-Final Office Action dated Mar. 5, 2014 for U.S. Appl. No. 12/972,271 (12 pgs.).
Non-Final Office Action mailed Oct. 15, 2012 for U.S. Appl. No. 13/562,825 (20 pgs.).
Response dated Feb. 10, 2014 to Office Action dated Apr. 10, 2014 for U.S. Appl. No. 13/069,334 (3 pgs).
Response dated Jul. 25, 2012 to Non-Final Office Action Apr. 25. 2012 for U.S. Appl. No. 12/757,912 (27 pgs.).
Response dated Mar. 25, 2013 to Final Rejection dated Oct. 23, 2012 for U.S. Appl. No. 12/757,912 (20 pgs.).
Response dated Oct. 18, 2011 to Office Action mailed Jul. 20, 2011 for U.S. Appl. No. 11/947,571 (11 pgs.).
USPTO Applicant-Initiated interview Summary dated Apr. 23, 2013 for U.S. Appl. No. 12/757,912 (3 pgs.).
USPTO Final Rejection dated Dec. 5, 2013 for U.S. Appl. No. 12/972,271 (9 pgs.).
USPTO Final Rejection dated Oct. 23, 2012 for U.S. Appl. No. 12/757,912 (19 pgs.).
USPTO Non-Final Office Action dated Apr. 25, 2012 for U.S. Appl. No. 12/757,912 (45 pgs.).
USPTO Non-Final Office Action dated Jun. 5, 2013 for U.S. Appl. No. 12/972,271 (25 pgs.).
Response dated Mar. 25. 2013 to Final Rejection dated Oct. 23, 2012 for U.S. Appl. No. 12/757,912.
U.S. Appl. No. 12/248,644, filed Oct. 9, 2008.
U.S. Appl. No. 12/475,242, filed May 29, 2009.
U.S. Appl. No. 12/720,261, filed Mar. 9, 2010.
U.S. Appl. No. 12/757,912, filed Apr. 19, 2010.
U.S. Appl. No. 12/859,159, filed Aug. 18, 2010.
U.S. Appl. No. 12/952,369, filed Nov. 23, 2010.
U.S. Appl. No. 13/069,334, filed Mar. 22, 2011.
U.S. Appl. No. 13/495,402, filed Jun. 13, 2012.
U.S. Appl. No. 13/523,846, filed Jun. 14, 2012.
U.S. Appl. No. 13/560,423, filed Jul. 27, 2012.
U.S. Appl. No. 13/562,825, filed Jul. 31, 2012.
U.S. Appl. No. 13/828,582, filed Mar. 14, 2013.
U.S. Appl. No. 12/686,895, filed Jan. 13, 2010.
U.S. Appl. No. 13/300,946, filed Nov. 21, 2011.
USPTO Non-Final Office Action dated Apr. 25, 2012 for U.S. Appl. No. 12/757,912 (17 pgs.).
Written Opinion of the International Searching Authority and International Search Report issued in International Patent Application No. PCT/US10/61132 on Apr. 19, 2011.
Response dated Jul. 25, 2012 to Non-Final Office Action Apr. 25, 2012 for U.S. Appl. No. 12/757,912 (27 pgs.).
Response dated Sep. 16, 2013 to Office Action dated Jun. 5, 2013 for U.S. Appl. No. 12/972,271.
USPTO Applicant-Initiated Interview Summary dated Apr. 23, 2013 for U.S. Appl. No. 12/757,912.
USPTO Final Rejection dated Oct. 23, 2012 for U.S. Appl. No. 12/757,912.

\* cited by examiner

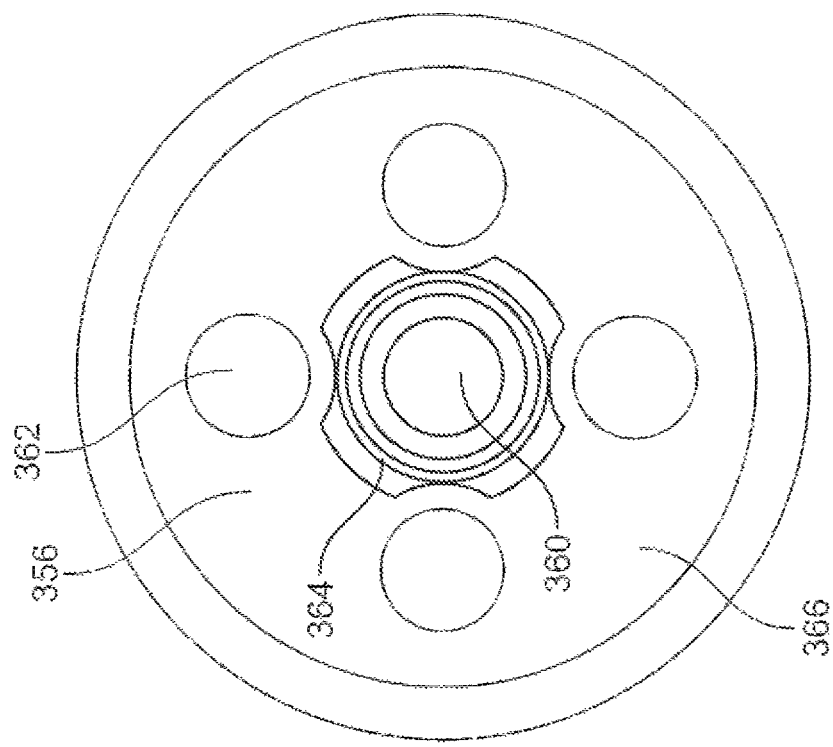
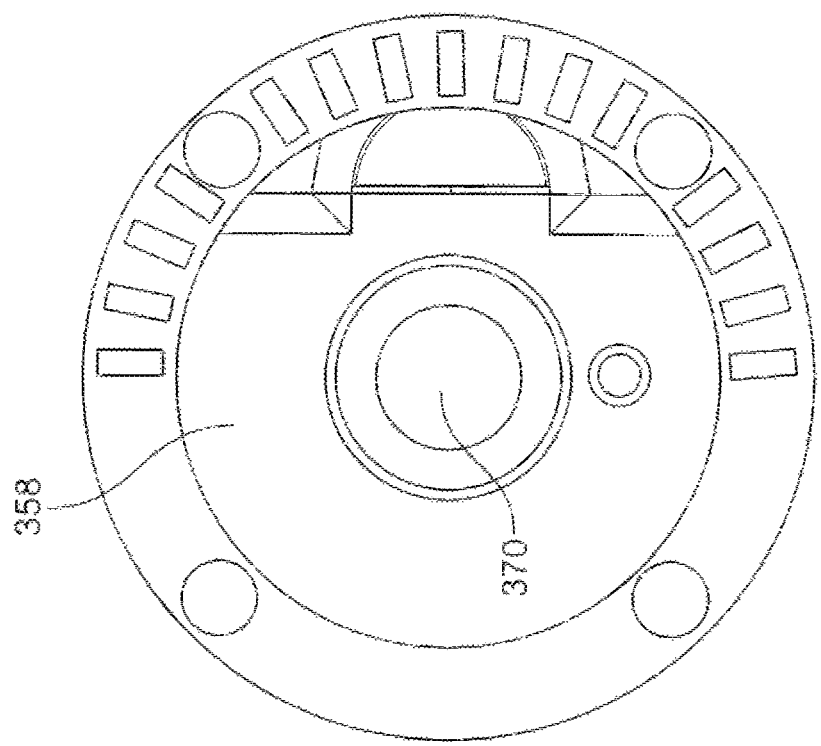
FIG. 12

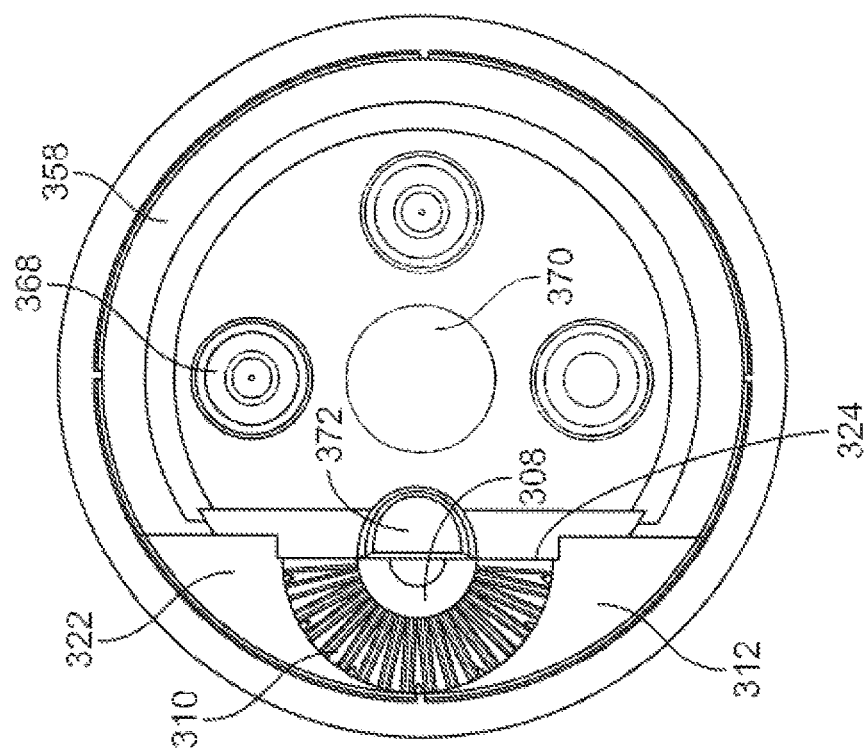
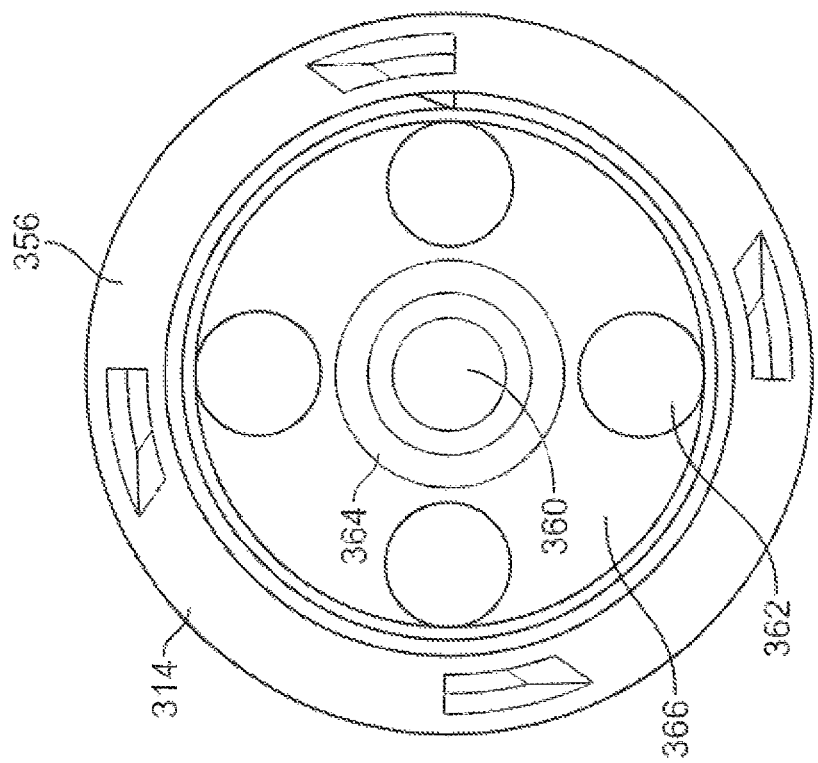
FIG. 13

IRRIGATION SPRAY NOZZLE AND MOLD ASSEMBLY AND METHOD OF FORMING NOZZLE

FIELD

This invention relates generally to irrigation spray nozzles and, more particularly, to an irrigation nozzle with a relatively low precipitation rate and uniform fluid distribution and a mold assembly and method of forming the nozzle.

BACKGROUND

Efficient irrigation is a design objective of many different types of irrigation devices. That objective has become increasingly important due to concerns and regulation at the federal, state and local levels of government regarding the efficient usage of water. Over time, irrigation devices have become more efficient at using water in response to these concerns and regulations. However, there is an ever-increasing need for efficiency as demand for water increases.

As typical irrigation sprinkler devices project streams or sprays of water from a central location, there is inherently a variance in the amount of water that is projected to areas around the location of the device. For example, there may be a greater amount of water deposited further from the device than closer to the device. This can be disadvantageous because it means that some of the area to be watered will be over watered and some of the area to be watered will receive the desired about of water or, conversely, some of the area to be watered will receive the desired amount of water and some will receive less than the desired about of water. In other words, the distribution of water from a single device is often not uniform.

Two factors contribute to efficient irrigation: (1) a relatively low precipitation rate to avoid the use of too much water; and (2) relatively uniform water distribution so that different parts of the terrain are not overwatered or underwatered. The precipitation rate generally refers to the amount of water used over time and is frequently measured in inches per hour. It is desirable to minimize the amount of water being distributed in combination with sufficiently and uniformly irrigating the entire terrain.

Some conventional nozzles use a number of components that are molded separately and are then assembled together. For example, U.S. Pat. No. 5,642,861 is an example of a fixed arc nozzle having a separately molded nozzle base for mounting the nozzle to a fluid source, base ring, and deflector for directing the fluid outwardly from the nozzle. Other nozzles are complex and have a relatively large number of parts. For example, U.S. Published Application No. 2009/0188991 discloses a nozzle that uses a number of inserts and plugs installed within ports. As an alternative, it would be desirable to have a nozzle having a simple one-piece, molded nozzle body that may reduce the costs of manufacture.

Accordingly, a need exists for a nozzle that provides efficient irrigation by combining a relatively low precipitation rate with uniform water distribution. Further, many conventional nozzles include a number of components, such as a nozzle base, nozzle collar, deflector, etc., which are often separately molded and are then assembled to form the nozzle. It would be desirable to reduce the cost and complexity of nozzles by reducing the number of separately molded components. It would be desirable to be able to form a one-piece, molded nozzle body that would avoid the need for separate component molds and the need for assembly after component molding.

BRIEF DESCRIPTION OF THE DRAWINGS

FIG. 12 is a top plan view of the nozzle cap and base of FIG. 9;
FIG. 13 is a bottom plan view of the nozzle cap and base of FIG. 9.

DESCRIPTION OF THE PREFERRED EMBODIMENTS

Figure 1:
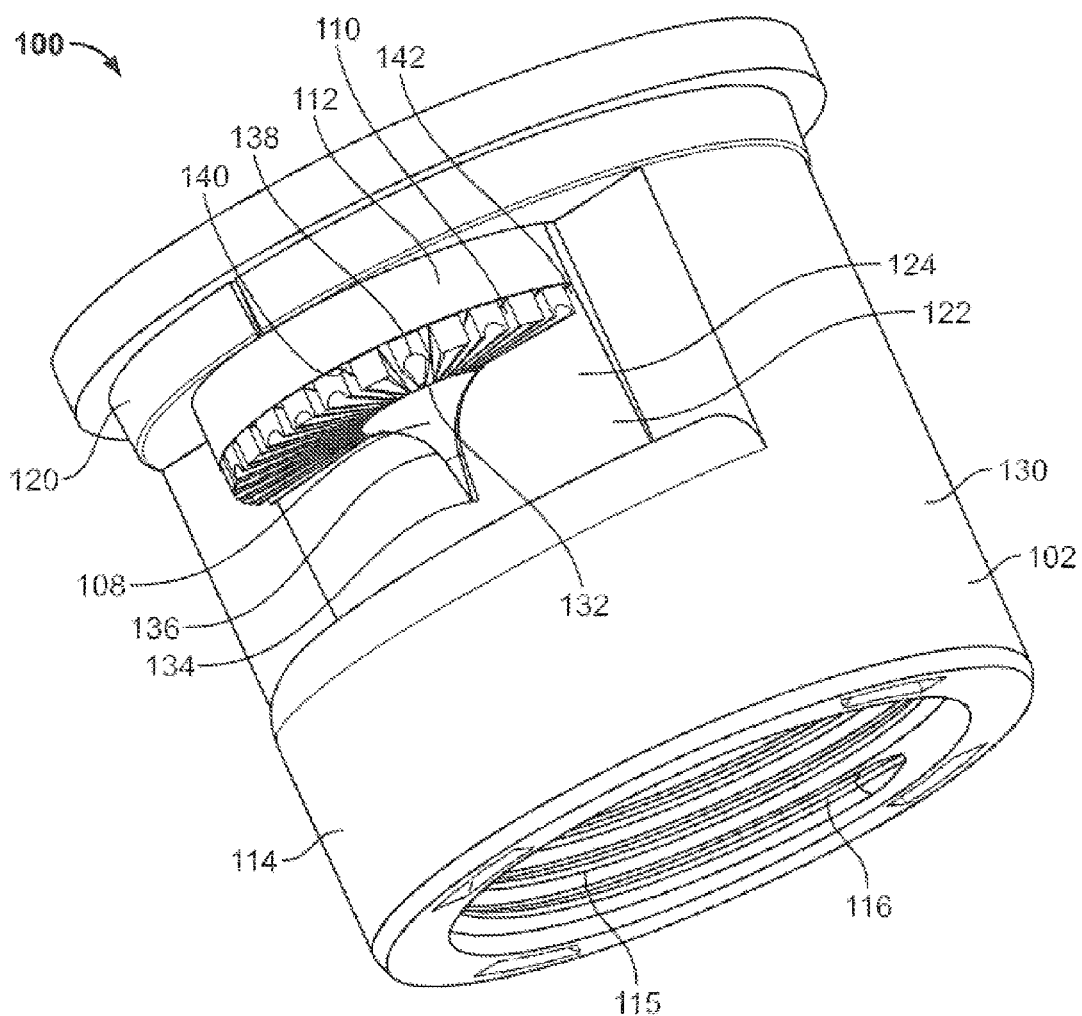
FIG. 1 is a bottom perspective view of a first embodiment of a nozzle embodying features of the present invention.

The exemplary drawings show a nozzle hat improves efficiency of irrigation by combining a relatively low precipitation rate with relatively uniform fluid distribution. The nozzle includes a small inflow port to allow a relatively small volume of water through the nozzle, i.e., to provide a low precipitation rate. The spray nozzle further includes a deflector with a profile including rib structures forming different types of flow channels that separate fluid into different streams in order to improve the overall water distribution, i.e., to provide relatively uniform fluid distribution. Many conventional irrigation nozzles have deflectors with a series of similarly shaped radial vanes that distribute one type of fluid spray. In contrast, the deflectors of the preferred embodiments have a series of ribs with structures disposed in the flow paths of the fluid resulting in different streams have different characteristics. The different sprays combine to provide a relatively uniform water distribution pattern.

One embodiment of a nozzle 100 is shown in FIGS. 1-5. In this form, the nozzle 100 generally comprises a compact unit, preferably made primarily of lightweight molded plastic, which is adapted for convenient thread-on mounting onto the upper end of a stationary or pop-up riser (not shown). The nozzle 100 preferably includes a one-piece nozzle body 102 and a flow throttling screw 104. In operation, fluid under pressure is delivered through the riser to the nozzle body 102. The fluid preferably passes through an inflow port 106 controlled by the throttling screw 104 that regulates the amount of fluid flow through the nozzle body 102. The nozzle 100 also preferably includes a filter (not shown) to screen out particulate matter upstream of the inflow port 106. Fluid is directed generally upwardly through the inflow port 106, along a generally conical transition surface 108, and then along ribs 110 formed in the underside surface of a deflector 112.

As can be seen, the nozzle body 102 is preferably generally cylindrical in shape. It includes a bottom mounting end 114 forming an inlet 115 and with internal threading 116 for mounting of the nozzle body 112 to corresponding external threading on an end of piping, such as a riser, supplying water. The nozzle body 102 also defines a central bore 118 to receive the flow throttling screw 104 to provide for adjustment of the inflow of water into the nozzle body 102. Threading may be provided at the central bore 118 to cooperate with threading on the screw 104 to enable movement of the screw 104. The nozzle body 102 also preferably includes a top deflecting end 120 defining the underside surface of the deflector 112 for deflecting fluid radially outward through a fixed, predetermined arcuate span. Further, the nozzle body 102 includes a recess 122 defined, in part, by a boundary wall 124 and with the conical transition surface 108 disposed within the recess 122.

Figure 4:
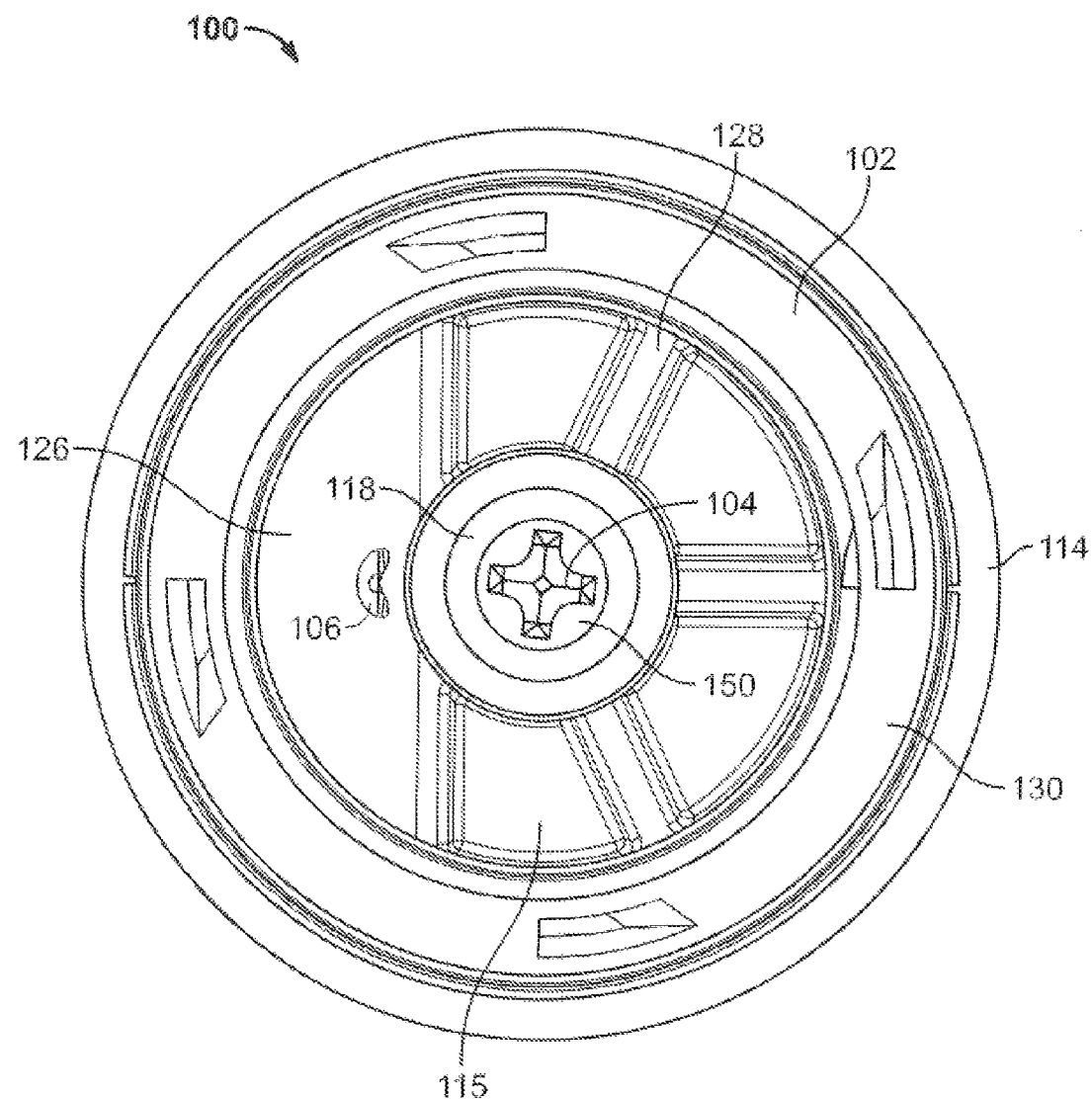
FIG. 4 is a bottom plan view of the nozzle of FIG. 1.

As can be seen in FIG. 4, for the half-circle nozzle 100, the inflow port 106 is preferably generally semi-circular in cross-section. The semi-circular shape may be modified slightly to be more C-shaped to seek to improve fluid flow at the edges of the flow pattern. The inflow port 106 is preferably disposed in a plate 126 located downstream of the internal threading 116 and is preferably located adjacent the central bore 118 that receives the throttling screw 104. The nozzle body 102 may also include support ribs 128 connecting the central bore 118 to the outer cylindrical wall 130.

Although in this embodiment the threading is shown as internal threading 116, it should be evident that the threading may be external threading instead. Some risers or fluid source are equipped with internal threading at their upper end for the mounting of nozzles. In this instance, the nozzle may be formed with external threading for mounting to this internal threading of the riser or fluid source.

Figure 6:
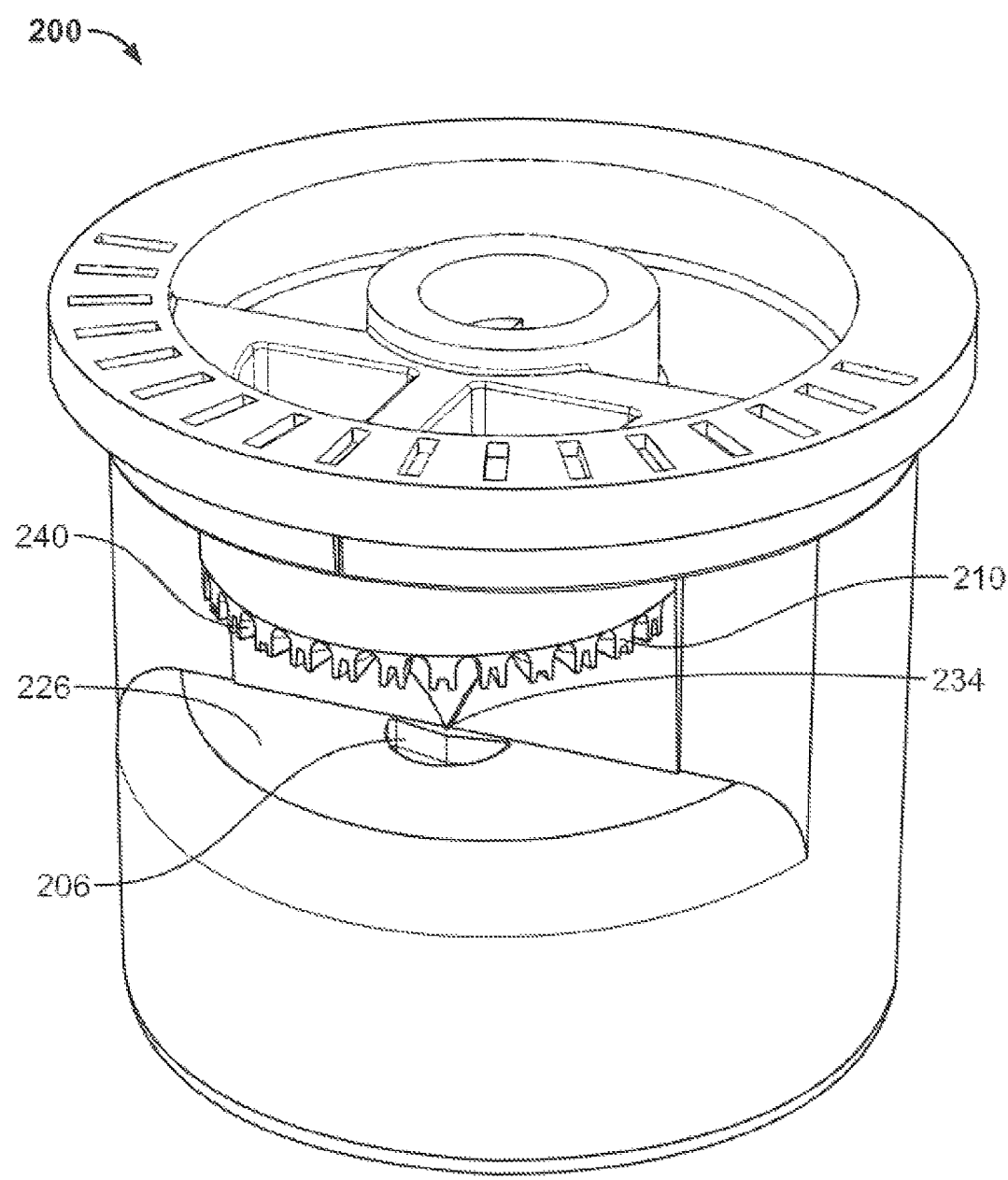
FIG. 6 is a top perspective view of a second embodiment of a nozzle embodying features of the present invention.
Figure 7:
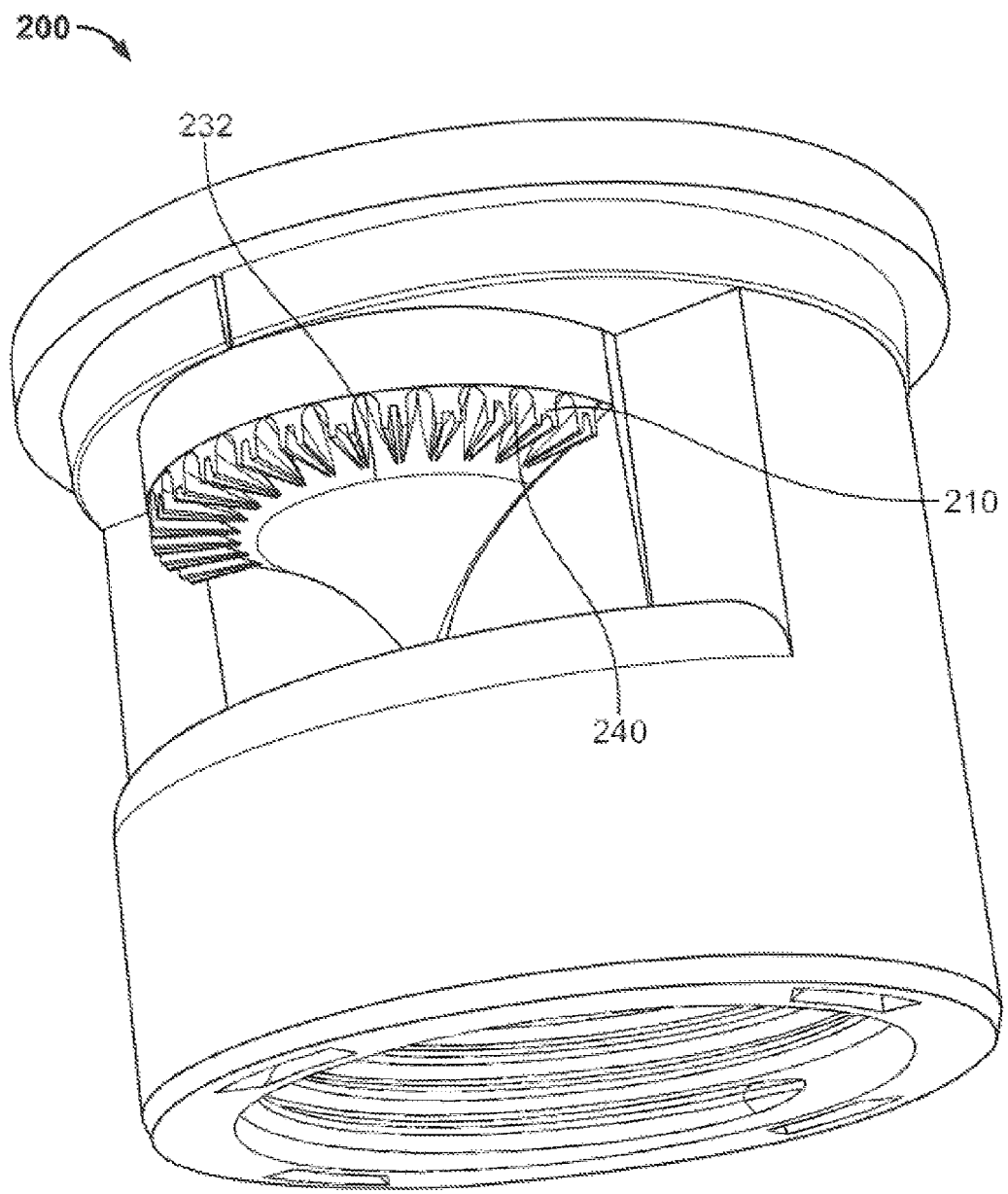
FIG. 7 is a bottom perspective view of the nozzle of FIG. 6.
Figure 8:
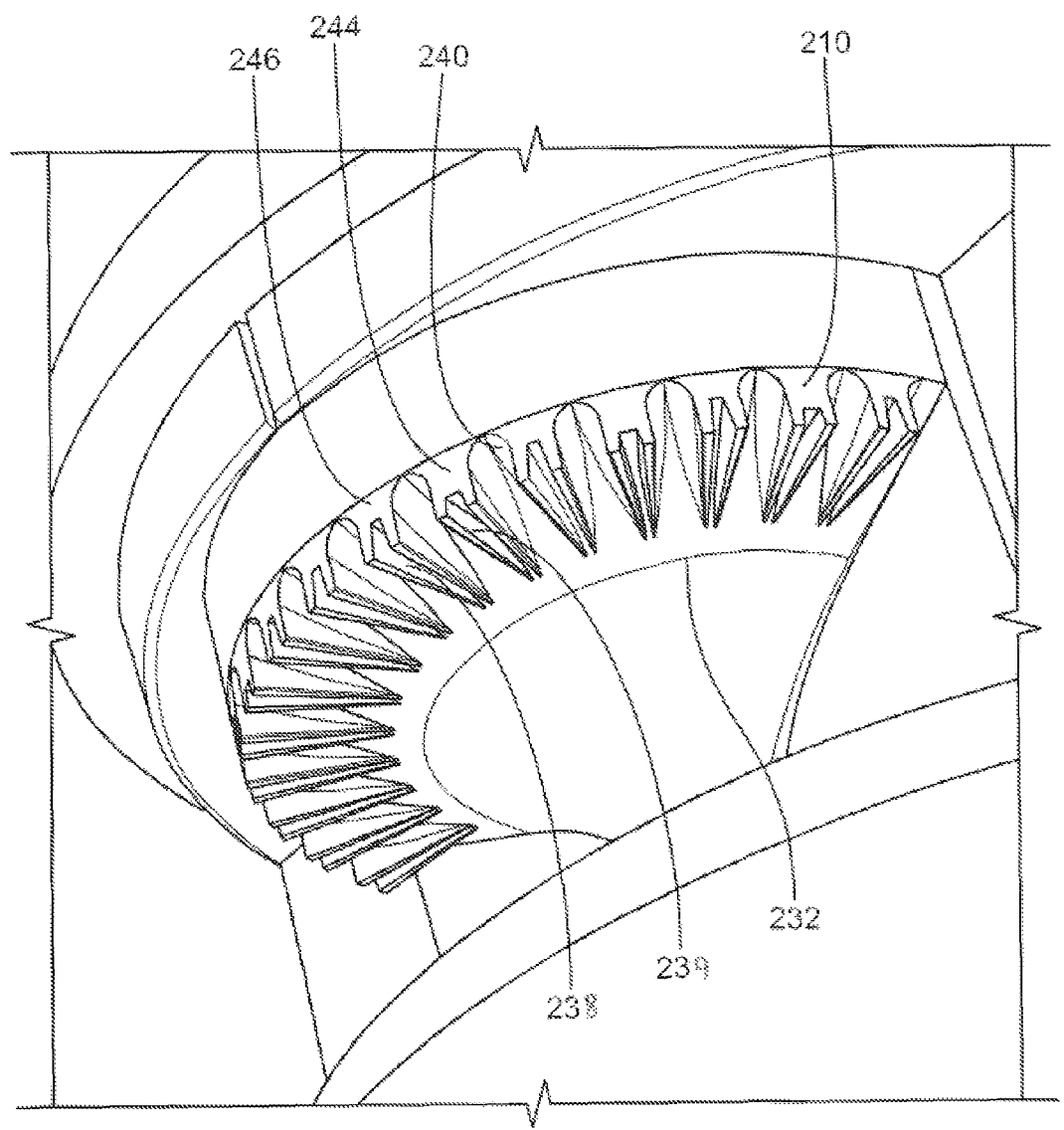
FIG. 8 is a detailed perspective view of the ribs on the underside of the deflector portion of the nozzle of FIG. 6.
Figure 9:
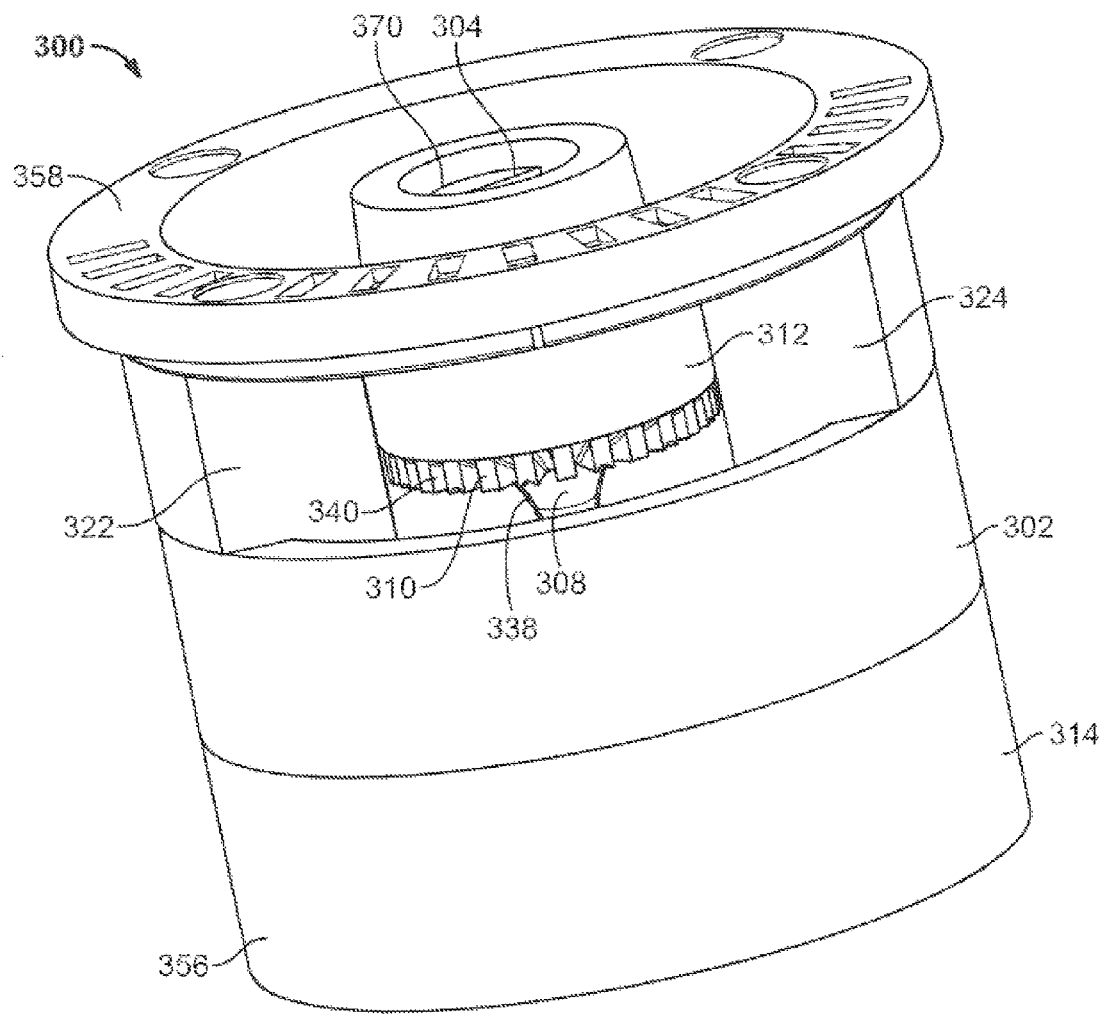
FIG. 9 is a perspective view of a third embodiment of a nozzle embodying features of the present invention.

The radius of the inflow port 106 may be modified in different models to match the precipitation rate. In one preferred form, the radius is about 0.032 inches, which results in a low precipitation rate of that is less than 1 inch per hour, preferably about 0.9 inches per hour. The radius of the inflow port 106 is preferably increased to match this precipitation rate for nozzles intended to have a longer maximum throw radius. FIGS. 1-5 shows an embodiment intended to have a maximum throw radius of about 8 feet, and FIGS. 6-8 show another embodiment with a larger inflow port 206 and intended to have a maximum throw radius of about 15 feet. The radius of the 15-foot nozzle 200 is preferably about 0.057 inches to achieve the matched precipitation rate of about 0.9 inches per hour. As should be evident, the radiuses of inflow ports of other models having different throw radiuses would preferably be selected so as to match this precipitation rate.

Further, as addressed below, the shape of the inflow port may be modified to achieve different fixed arcuate spans. For example, the cross-section of the inflow port may be in the shape of a quarter-circle for quarter-circle (or 90 degree) irrigation, or two opposing semi-circular inflow ports may be used to achieve close to full circle (or 360 degree) irrigation. Alternatively, two inflow ports (one semi-circular in cross-section and the other quarter-circle in cross-section) may be used to achieve roughly three-quarters (or 270 degree) irrigation, or two inflow ports of approximately the same size may be formed to achieve this three-quarters irrigation. Again, these models with different arcuate spans would preferably have matched precipitation rates of about 0.9 inches per hour.

As can be seen in FIGS. 1-5, once fluid flows through the inflow port 106, it then flows along the conical transition surface 108 to a water distribution profile on the underside of the deflector 112. The transition surface 108 is intermediate of the port 106 and the profile, which includes a plurality of ribs 110, and guides flow directed through the port 106 to the flow channels defined by the ribs 110. The transition surface 108 is aligned with and expands smoothly outwardly in the direction of the plurality of ribs 110 and reduces energy loss experienced by fluid flowing from the port 106 to the flow channels. The transition surface 108 is generally conical in shape having a vertex 134 disposed near the port 106 expanding into smoothly curved sides 136 having increasing curvature in the direction of the deflector 112 and terminating in a base 132 near the plurality of ribs 110. For the half-circle nozzle 100, the conical transition surface 108 is preferably in the shape of an inverted half-cone with a generally semi-circular base 132 on the underside of the deflector 112 and a vertex 134 offset slightly from the boundary wall 124. The curved sides, or edge surface 136, of the conical transition surface 108 is preferably curved to smoothly guide upwardly directed fluid radially and outwardly away from the central axis of the nozzle body 102 to the ribbed deflector surface. The portion of the cone near the vertex 134 is preferably inclined closer to vertical with less curvature, and the portion of the cone near the base 132 preferably has greater curvature. Various different form of curvature may be used for the conical transition surface 108, including catenary and parabolic curvature. Also, as should be evident, the surface 108 need not be precisely conical.

The dimensions of the conical transition surface may be modified in different models to provide different flow characteristics. For example, the vertex may be located at different vertical positions along the boundary wall, the semi-circular base may be chosen with different diameters, and the curved edge surface may be chosen to provide different degrees of curvature. These dimensions are preferably chosen to provide a more abrupt transition for shorter maximum throw radiuses and a gentler transition for longer maximum throw radiuses. For instance, for the 8-foot nozzle 100 (in comparison to the 15-foot nozzle 200), the vertex 134 may be located higher along the boundary wall 124, the semi-circular base 132 may be smaller, and the curved edge surface 136 may have less curvature. Thus, for the 8-foot nozzle 100, the upwardly directed fluid strikes the underside surface of the deflector 112 more squarely, which dissipates more energy and results in a shorter maximum throw radius than the 15-foot nozzle 200.

Further, as with the inflow port, the shape of the conical transition surface may be modified to accommodate different fixed arcuate spans, as addressed further below. For example, the conical transition surface may be in the shape of an inverted quarter conical portion with a vertex and a quarter-circle base for quarter-circle (or 90 degree) irrigation. Alternatively, the nozzle body may include two inverted half-conical portions facing opposite one another to achieve close to full circle (or 360 degree) irrigation. Further, the nozzle body may include one inverted half-conical portion and one inverted quarter-conical portion facing opposite one another for three-quarters (or 270 degree) irrigation, or the nozzle body may include two conical portions of approximately the same size for this three-quarters irrigation.

As shown in FIGS. 1-5, the deflector 112 is generally semi-cylindrical, and in this form, the deflector 112 has a diameter of about 0.475 inches and a depth of about 0.074 inches (from the top of the deflector 112 to the start of the ribs 110). The deflector 112 has an underside surface that is contoured to deliver a plurality of fluid streams generally radially outwardly therefrom through a predetermined arcuate span. In the half-circle nozzle 100, the arcuate span is preferably about 180 degrees, although other predetermined arcuate spans are available. As shown in FIGS. 1-3 and 5, the underside surface of the deflector 112 preferably defines a water distribution profile that includes an array of ribs 110. The ribs 110 subdivide the water into multiple flow channels for a plurality of water streams that are distributed radially outwardly therefrom to surrounding terrain. As addressed further below, the ribs 110 include grooves (or notches) 138 therein, and successive ribs 110 are separated by grooves 140, to form flow channels that provide different trajectories with different elevations for the water streams. These different trajectories allow water distribution to terrain relatively close to the nozzle 100 and to terrain relatively different from the nozzle 100, thereby improving uniformity of water distribution.

Figure 5:
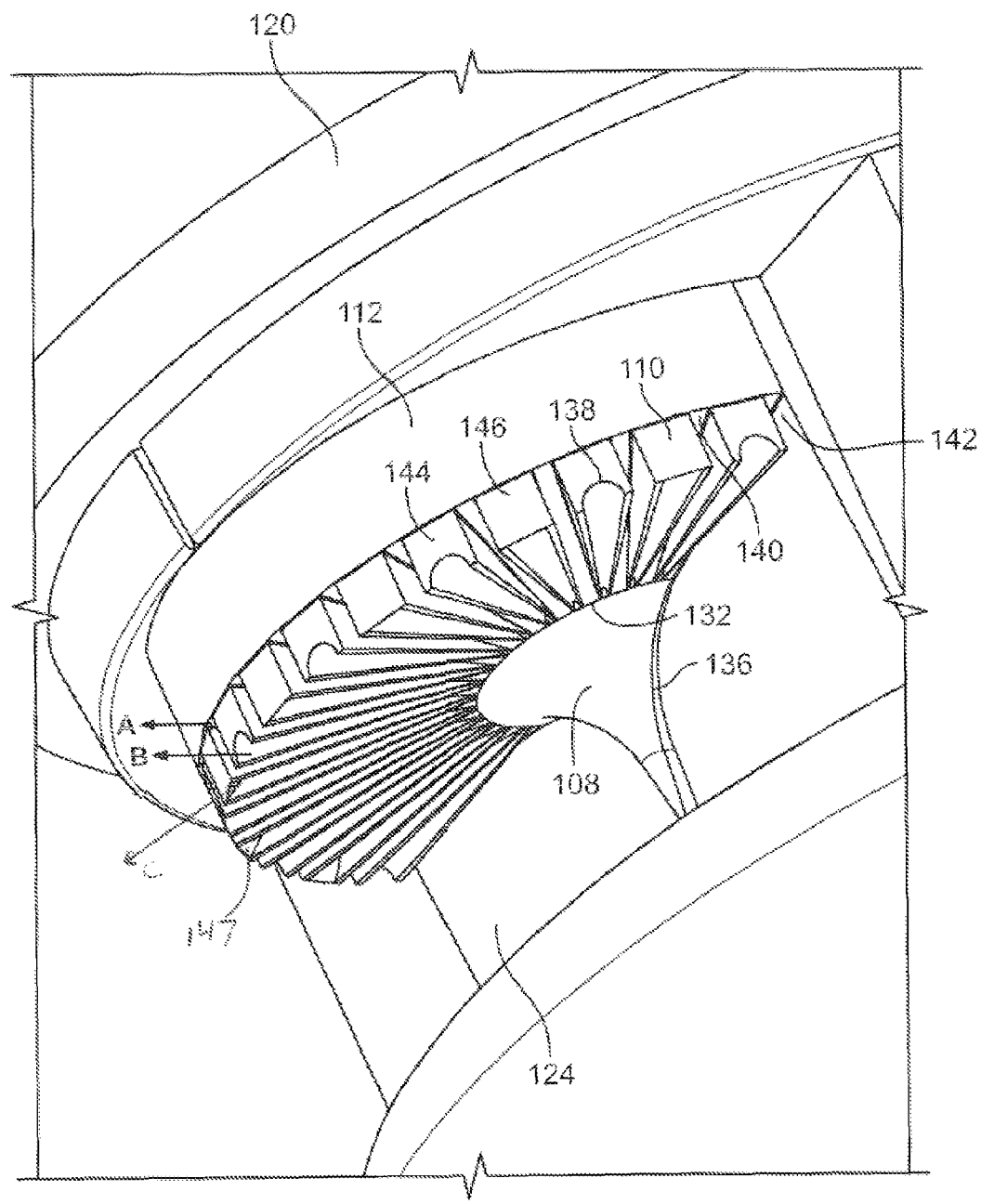
FIG. 5 is a detailed perspective view of the ribs on the underside of the deflector portion of the nozzle of FIG. 1.

In view of this deflector configuration, the nozzle 100 shown in FIGS. 1-5 is known as a multi-stream, multi-trajectory nozzle. As can be seen in FIG. 5, the deflector 112 is contoured to create flow channels for water streams having at least three different types of trajectories: (1) a distant trajectory with a relatively high elevation (A); (2) an intermediate trajectory with an intermediate elevation (B); and (3) a close-in trajectory with a relatively low elevation (C). These three different water trajectories allow coverage of terrain at different distances from the nozzle 100 and thereby provide relatively uniform coverage.

First, the ribs 110 are preferably separated by grooves 140 that allow one set of water streams to travel the most distant trajectory (A). More specifically, the grooves 140 extend into the underside surface of the deflector 112 such that water streams flow within these grooves 140 and are distributed the furthest from the nozzle 100. The grooves 140 slope upwardly as one proceeds radially outwardly from the conical transition surface 108 to the outer end of the groove 140. These grooves 140 may be cut to a desired depth within the underside surface to achieve a desired trajectory. For nozzle 100, in one form, the grooves 140 may have a depth of about 0.034 inches at their outer ends, which defines the outer height of ribs 110, and a groove width of about 0.013 inches. FIGS. 1-3 and 5 show that the grooves 140 of nozzle 100 are preferably rectangular in cross-section.

The grooves can be of other shapes and dimensions. For example, in the 15-foot nozzle 200, in one form, the grooves 240 are not rectangular in cross-section, but instead, are arched in shape, as can be seen in FIGS. 6-8. In other words, the grooves 240 are curved in shape (because the bases of the ribs 210 are wider than the tips of the ribs 210).

Further, the nozzle body 102 also preferably includes two edge grooves 142 disposed between the boundary wall 124 and a rib 110 on each side of the deflector 112. These edge grooves 142 define and reinforce the edges of the 180 degree water distribution arc. Without these edge grooves 142, the water distribution pattern may not have clearly defined and aesthetically pleasing edges and may not provide sufficient irrigation at the edges of the pattern. The nozzles 100 and 200 preferably include 16 grooves 140 to accommodate 16 streams for the most distant trajectory (A).

Second, alternating ribs 144 preferably have grooves (or notches) 138 extending within them to allow water streams to travel the intermediate trajectory (B). These notches 138 extend within the ribs 144 but are not as deep as grooves 140 so water streams flowing along these notches 138 do not have a trajectory as distant as water streams flowing within the grooves 140. In other words, the notches 138 slope upwardly as one proceeds radially outwardly but not as steeply as the grooves 140. Again, as should be evident, the depth of the notches may be tailored within different models to provide different intermediate trajectories. Nozzle 100 preferably includes eight notches 138 to accommodate eight streams for the intermediate trajectory (B), and in one form, each notch 138 may have a diameter of about 0.025 inches at their outer ends.

Third, a second set of alternating ribs 146 are provided for the 8-foot nozzle 100, as can be seen in FIGS. 1-3 and 5, that have no notches within them at all. This second set of alternating ribs 146 allows water streams to travel to the close-in trajectory (C). As can be seen, water streams traveling along or adjacent the tips of these ribs 146 have a shorter trajectory than streams flowing within the notches 138 or grooves 140. The nozzle 100 preferably includes seven ribs 146 (without notches) to accommodate seven streams for the close-in trajectory (C). These alternating ribs 146 preferably have downwardly-inclined ramps 147 at their outer ends to deflect fluid downwardly. For the 8-foot nozzle 100, in view of the relatively short throw radius, the ramps 147 may be desirable to cause a sharp abrupt transition and lower elevation for fluid streams to facilitate close-in irrigation.

As an alternative, as shown for the 15-foot nozzle 200, the second set of alternating ribs 246 may have a groove (or notch) 246 cut into each of them, but this notch 246 is not as deep as for the first set of alternating ribs 244. So, there are two different types of grooves or notches (a deep notch 238 and a shallow notch 239) defining flow channels for two different water streams with different trajectories. This is shown in FIGS. 6-8 for nozzle 200 and may be desirable for nozzles having a longer maximum throw radius. The depth of the first and second set of grooves (or notches) may be tailored to achieve a desired overlap of coverage and to seek to improve uniformity. For the 15-foot nozzle 200, the shallow notches 246 provide a basic downward channel shape that is not as abrupt or downwardly-inclined as the ramps 147. For the 15-foot nozzle, in view of the relatively longer throw radius, a less abrupt transition and relatively higher elevation may be desirable.

Also, the grooves/notches may be of different shapes. For example, for the 8-foot nozzle 100, the notch 138 is generally semi-circular in cross-section. In contrast, for the 15-foot nozzle 200, the notches 238 and 239 are trapezoidal in shape. As should be evident, other shapes may be used as well.

Further, as addressed below, the shape of the deflector may be modified to accommodate different fixed arcuate spans, i.e., 90, 270, and 360 degrees. For example, the deflector may include ribs disposed within 90 degrees for quarter-circle irrigation. Additionally, the nozzle body may include two 180 degree deflector surfaces facing opposite from one another to achieve close to full circle (or 360 degree) irrigation. The nozzle body may also include a 90 degree deflector surface combined with a 180 degree deflector surface to achieve 270 degree irrigation. Alternatively, the nozzle body might include two deflector surfaces of approximately the same size to achieve this three-quarters irrigation. For these modified embodiments, it is preferable to have edge grooves to provide a more distant trajectory for water streams at the edges of the pattern.

The nozzle 100 also preferably includes a flow throttling screw 104. The flow throttling screw 104 extends through the central bore 118 of the nozzle body 102. The flow throttling screw 104 is manually adjusted to throttle the flow of water through the nozzle 100. The throttling screw 104 includes a head 148, is seated in the central bore 118 and may be adjusted through the use of a hand tool. The opposite end 150 of the screw 104 is in proximity to the inlet 115 protected from debris by a filter (not shown). Rotation of the head 148 results in translation of the opposite end 150 for regulation of water inflow into the nozzle 100. The screw 104 may be rotated in one direction to decrease the inflow of water into the nozzle 100, and in the other to increase the inflow of water into the nozzle 100. In one preferred form, the screw 104 may shut off flow by engaging a seat of the filter. As should be evident, any of various types of screws may be used to regulate fluid flow.

In operation, when fluid is supplied to the nozzle 100, if flows upwardly through the filter and then upwardly through the inflow port 106. Next, fluid flows upwardly along the conical transition surface 108, which guides the fluid to the ribs 110 of the deflector 112. The fluid is then separated into multiple streams, flow along the rib structures (notches 138, grooves 140, and downwardly-inclined ramps 147) and is distributed outwardly from the nozzle 100 along these flow channels with different trajectories to improve uniformity of distribution. A user regulates the maximum throw radius by rotating the flow throttling screw 104 clockwise or counterclockwise.

Figure 2:
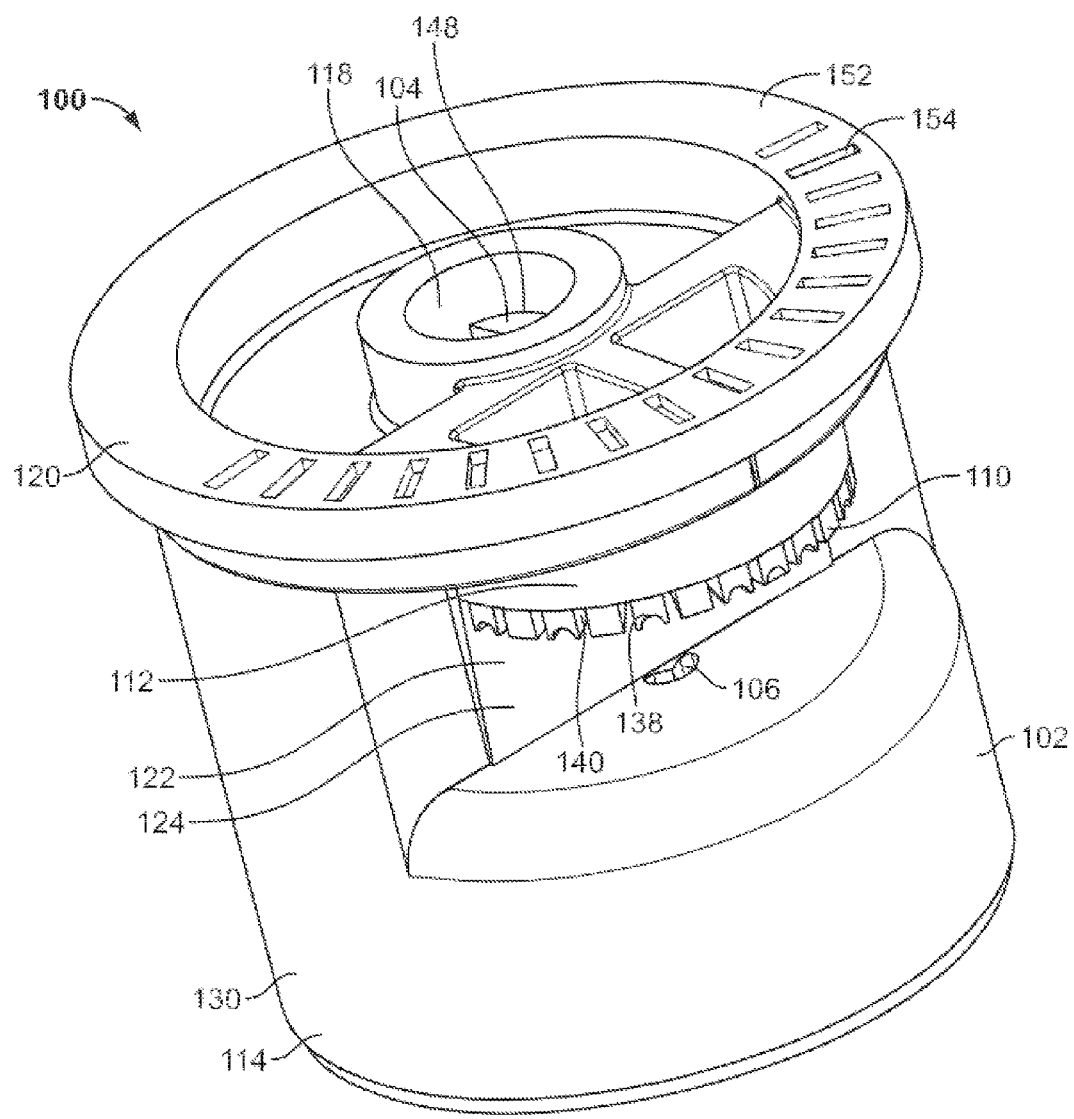
FIG. 2 is a top perspective view of the nozzle of FIG. 1.
Figure 3:
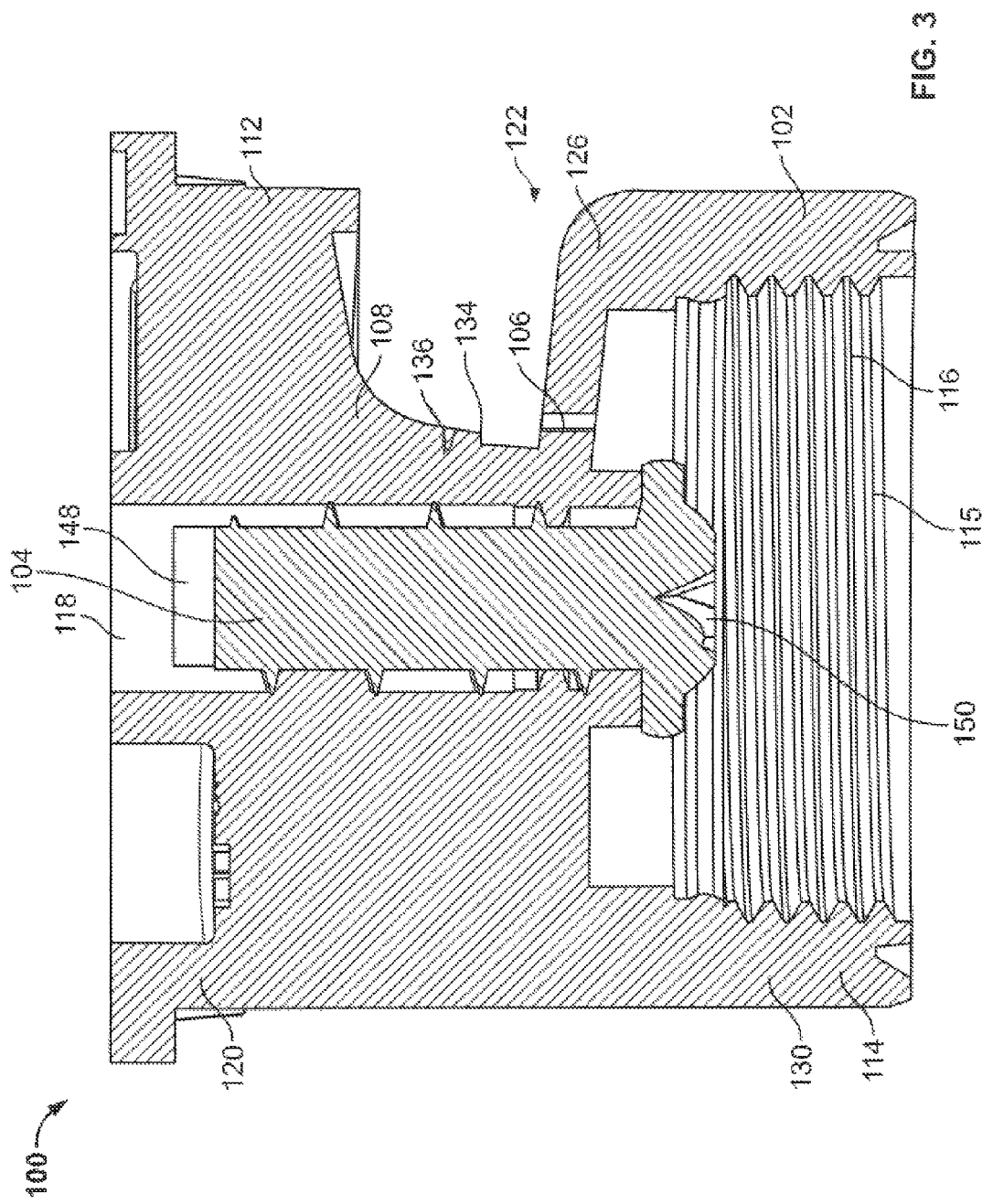
FIG. 3 is a cross-sectional view of the nozzle of FIG. 1.

Although the nozzles 100 and 200 shown in FIGS. 1-8 distribute fluid in a fixed 180 degree arc, i.e., nozzles 100 and 200 are half-circle nozzles, the nozzle may be easily manufactured to cover other predetermined water distribution arcs. Figures showing nozzles with other fixed distribution arcs are addressed below. Further, the top surface 152 of the top deflecting end 120 indicates the nature of the nozzle 100, i.e., half-circle, and the direction of spray from the nozzle 10. This top surface 152 is visible to the user during operation of the nozzle 100. As can be seen in FIG. 2, the top surface 152 has approximately one-half of its outer circumference covered with indicia, i.e., a series of radial lines 154, indicating that the nozzle 100 is a half-circle nozzle and indicating that spray is in the direction of the radial lines 154. Similarly, other nozzle models can include radial lines, serrations, or other indicia on the top surface to signify a quarter-circle, three-quarter circle, or full circle nozzle and the direction of water distribution.

Although the nozzles 100 and 200 addressed above include a one-piece, unitary nozzle body, other embodiments may have a nozzle body that includes several components. An example of such an embodiment is shown in FIGS. 9-13. In this preferred form, the nozzle 300 has a nozzle body 302 that includes a separate nozzle base 356 and nozzle cap 358. The nozzle 300 also includes a flow throttling screw 304 that operates in generally the same manner as described above for nozzles 100 and 200. The nozzle 300 preferably has a maximum intended throw radius of 15 feet, although other models with other throw radiuses are contemplated.

As shown in FIGS. 9-13, the nozzle base 356 is generally cylindrical in shape with a bottom mounting end 314 having internal threading 316 for coupling to external threading of a riser or other fluid source (although this threading may easily be reversed in other embodiments). The base 356 has a central bore 360 for receiving the flow throttling screw 304 and also preferably includes four other bores 362. The central bore 360 is defined by a central hub 364 that is received by the nozzle cap 358 (as described below). The four other bores 362 extend through an annular plate 366 and are preferably spaced circumferentially and equidistantly about the central bore 360. These bores 362 receive posts 368 of the nozzle cap 358 (as described below) to hold the cap 358 in a fixed relationship with respect to the base 356. As should be evident, a different number and arrangement of bores may be used in the nozzle base 356.

Figure 10:
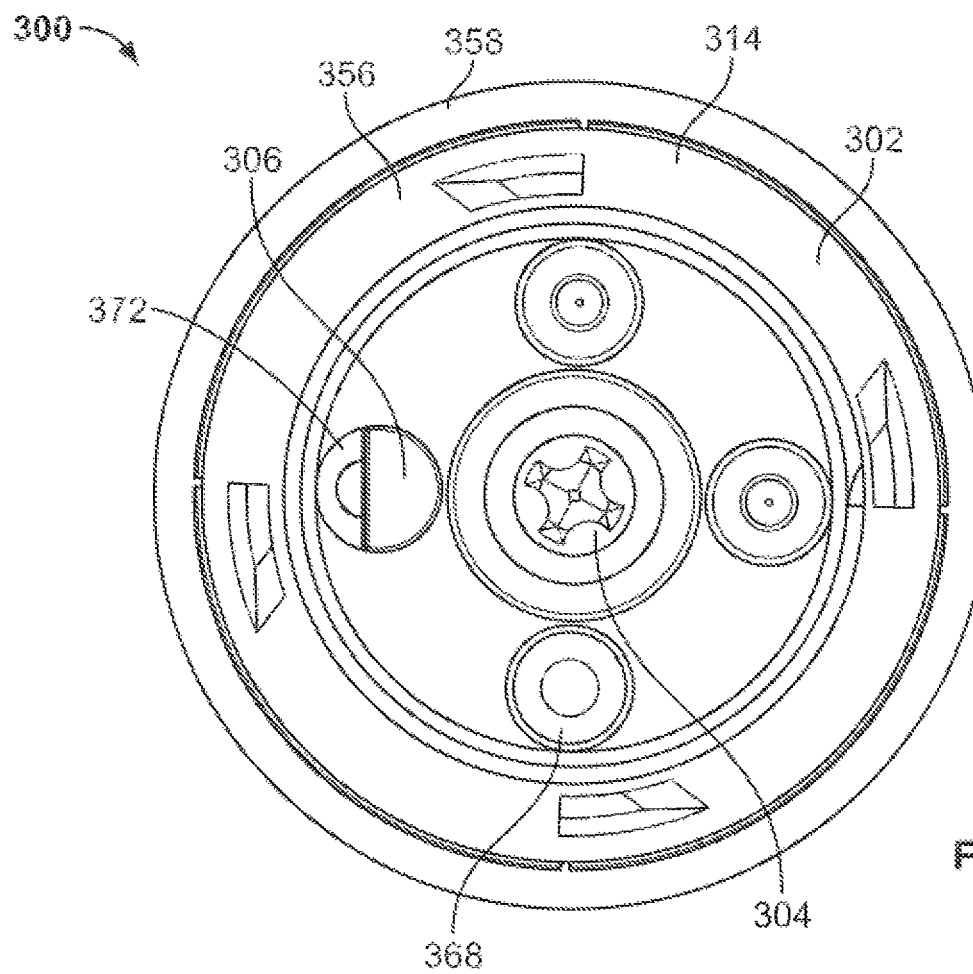
FIG. 10 is a bottom plan view of the nozzle of FIG. 9.
Figure 11:
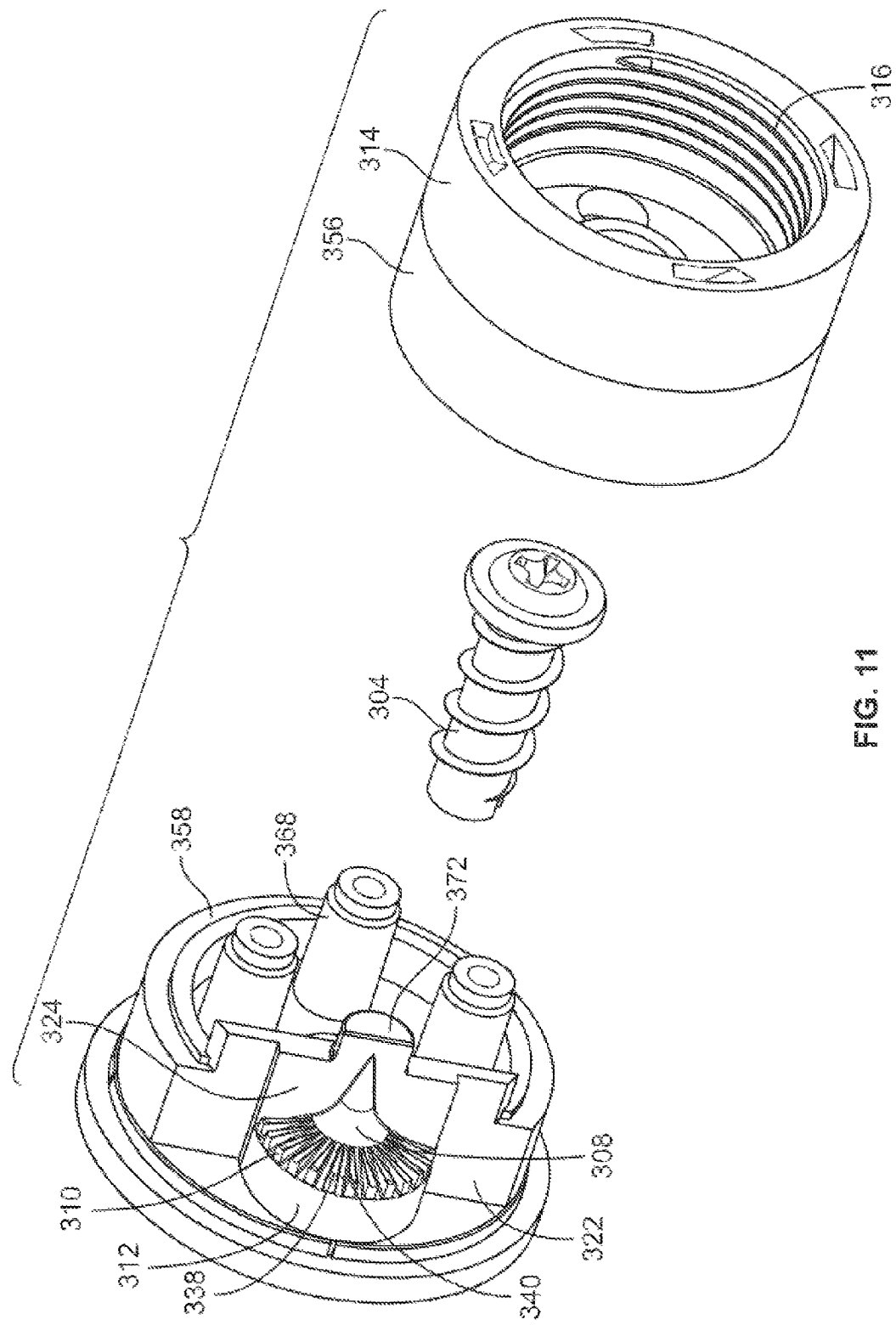
FIG. 11 is an exploded view of the nozzle of FIG. 9.
Figure 14:
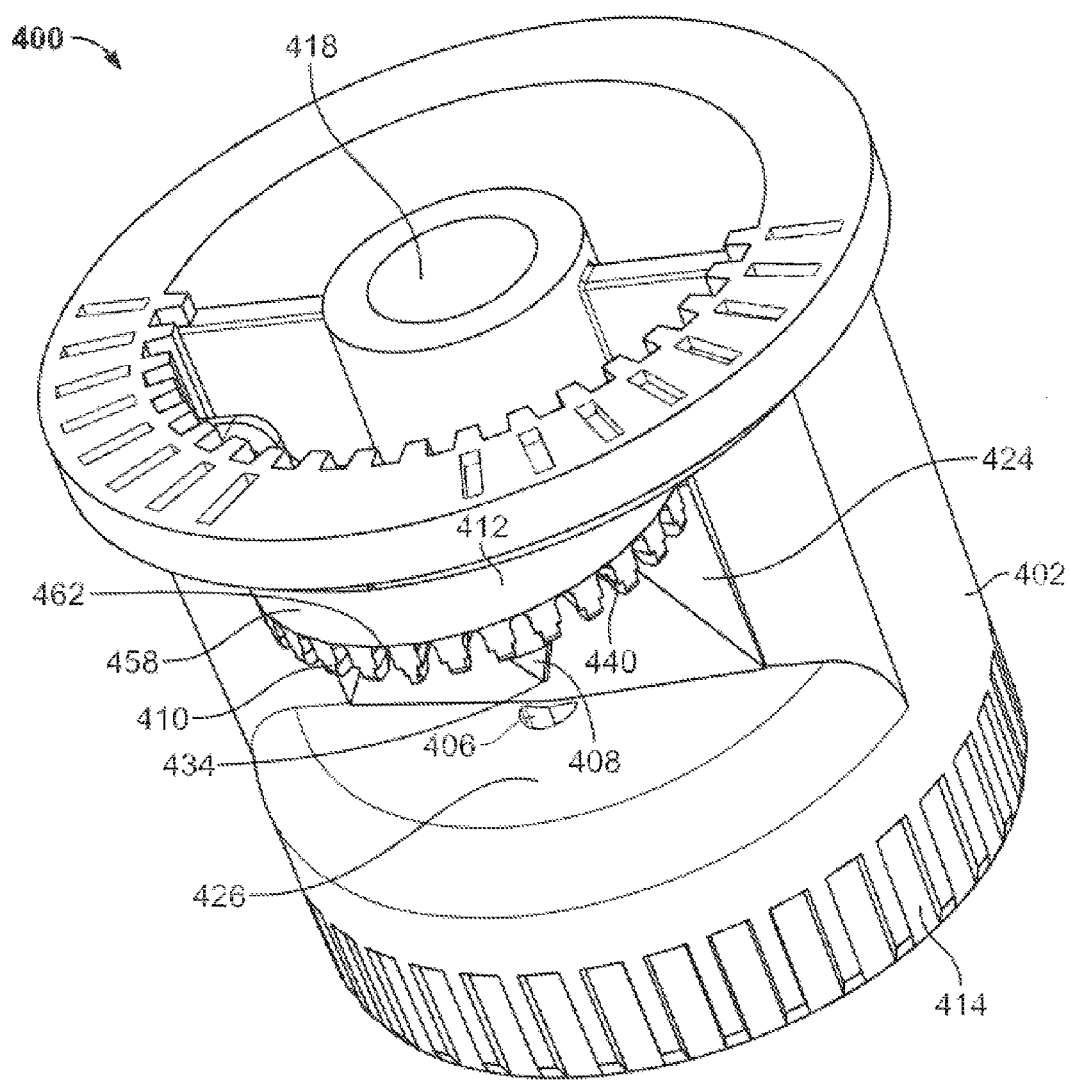
FIG. 14 is a top perspective view of a fourth embodiment of a nozzle embodying features of the present invention.
Figure 15:
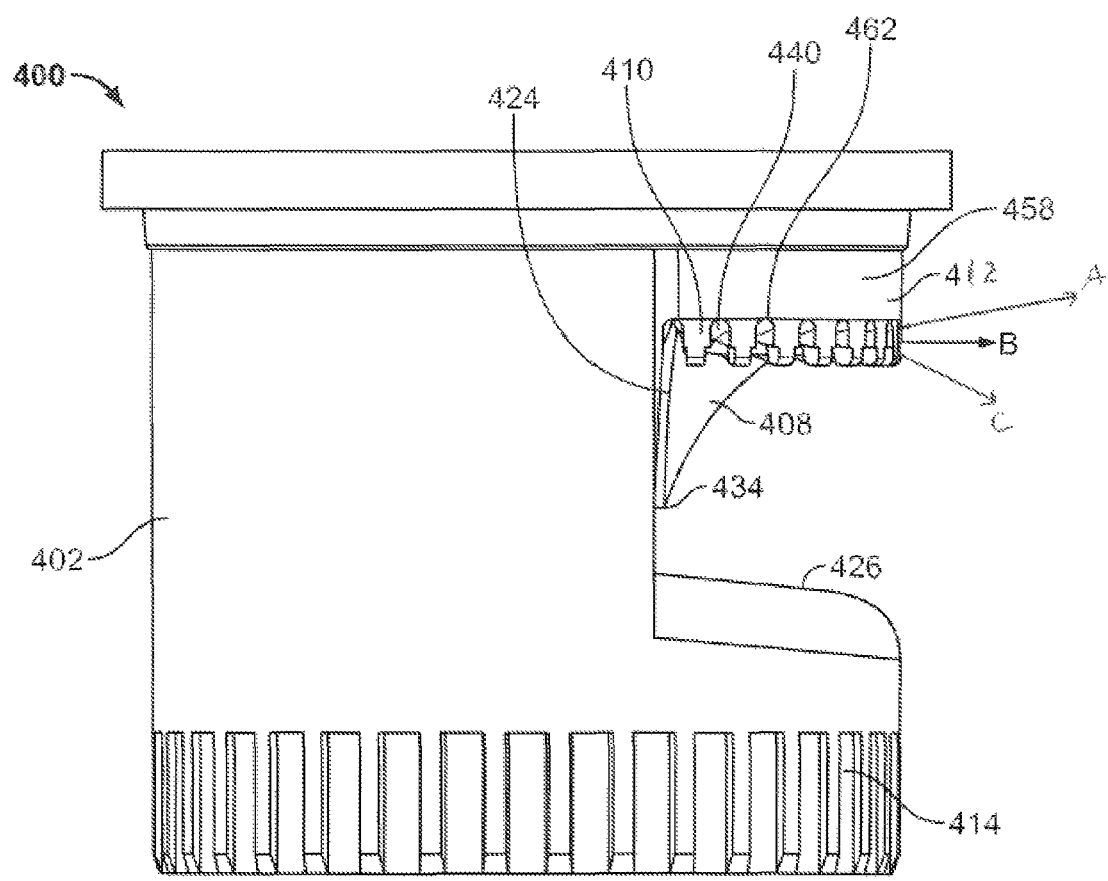
FIG. 15 is a side elevational view of the nozzle of FIG. 14.
Figure 16:
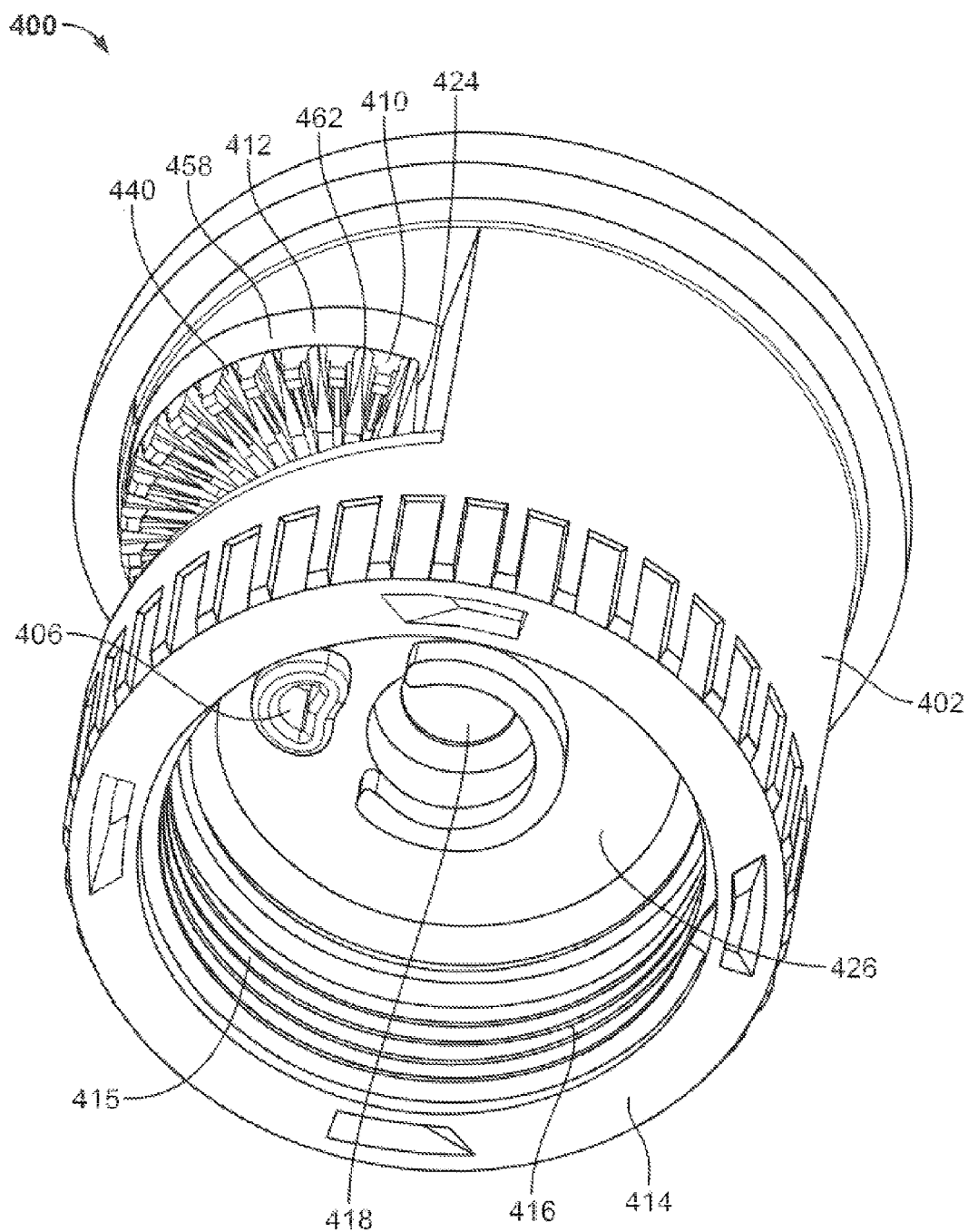
FIG. 16 is a bottom perspective view of the nozzle of FIG. 14.

Further, as can be seen in FIGS. 9-13, the nozzle cap 358 is also generally cylindrical in shape and is fashioned for mating engagement with the corresponding nozzle base 356. More specifically, the cap 358 includes a central bore 370 that receives both the central hub 364 of the base 356 and the throttling screw 304 and that includes downwardly-projecting posts 368 that are received within the bores 362 of the base 356. As shown in FIGS. 10, 11, and 13, one of the four posts is preferably in the form of a half-post 372 so as to define inflow port 306 having a generally semi-circular cross-section when the half-post 372 is inserted into its corresponding bore 362. The cap 358 also includes a deflector 312 for deflecting fluid radially outward through a fixed, predetermined arcuate span. Further, the cap 358 includes a recess 322 defined, in part, by a boundary wall 324 and with an inverted conical transition surface 308 disposed within the recess 322. As can be seen, the inflow port 306, the conical transition surface 308, the deflector 312, and rib structures are similar structurally to those described above for nozzles 100 and 200 and include similar characteristics.

In operation, fluid flows upwardly from a fluid source into the nozzle base 356. The posts 368 block upward fluid flow through three of the bores 362, and the half-post 372 allows upward fluid flow only through inflow port 306. Fluid flows through the inflow port 306, along the conical transition surface 308, and is guided to the ribs 310 of the deflector 312. The ribs 310 define flow channels that divide the water streams into three separate groups having three different trajectories with different elevations: (1) streams flowing within grooves 340; (2) streams flowing within notches 338; and (3) streams flowing adjacent tips of the ribs 310.

As should be evident, the nozzle 300 may be modified to irrigate different fixed arcs of terrain. For example, the nozzle may be fashioned as a quarter-circle nozzle by forming a quarter-circle inflow port (by changing the half-post into a post with a three-quarter circle cross-section), a quarter-circle conical transition surface, and a quarter-circle deflector with ribs. Alternatively, a full-circle nozzle may be fashioned by forming two half-circle inflow ports (by using two oppositely facing half-posts), two oppositely facing conical transition surfaces, and two oppositely facing deflectors with ribs. Further, a three-quarter circle nozzle may fashioned by forming two inflow ports (a half-circle and a quarter-circle inflow port), two conical transition surfaces (a half-circle and a quarter-circle transition surface), and two deflectors (a half-circle and a quarter-circle deflector). As another alternative, a three-quarter circle nozzle may be formed by forming two identical (or nearly identical) sets of inflow ports, conical transition surfaces, and deflectors.

Another preferred embodiment of a nozzle 400 with a one-piece nozzle body 402 is shown in FIGS. 14-17. The nozzle 400 preferably includes an inflow port 406, a conical transition surface 408, and a flow throttling screw (not shown) similar to those described in the above embodiments. The inflow port 406 is preferably disposed in a plate 426 located downstream of internal threading 416 in a bottom mounting end 414 and is preferably located adjacent the central bore 418 that receives the throttling screw. Like nozzle 100, nozzle 400 is preferably intended to have a maximum throw radius of about 8 feet and has some similar structural features. More specifically, the conical transition surface 408 is preferably in the shape of an inverted half-cone with a generally semi-circular base 432 on the underside of the deflector 412 and a vertex 434 disposed on the boundary wall 424. In one preferred form, the inflow port 406 has a radius of about 0.032 inches, and the nozzle 400 has a precipitation rate of about 0.9 inches per hour. The dimensions of the inflow port 406 and conical transition surface 408 may be altered to change fluid distribution characteristics, including the precipitation rate, the maximum intended throw radius, and the predetermined arcuate span of coverage. A flow throttling screw may be adjusted by the user to move it toward or away from the inlet 415 to decrease or increase the maximum throw radius. However, as addressed below, unlike nozzle 100, the underside of the deflector 412 has a water distribution profile that includes different rib features to provide different water sprays from those described above for other embodiments to achieve relatively uniform fluid distribution.

As shown in FIGS. 14-17, the deflector 412 includes a plurality of radially-extending ribs 410 that form part of its underside. Grooves 440 for water are formed between adjacent ribs 410 and have rounded bottoms 462 coinciding with the underside of the upper deflector surface 458. The ribs 410 are each configured to divide the fluid flow through the grooves 440 into different channels for different sprays directed to different areas and thereby having different characteristics.

Figure 17:
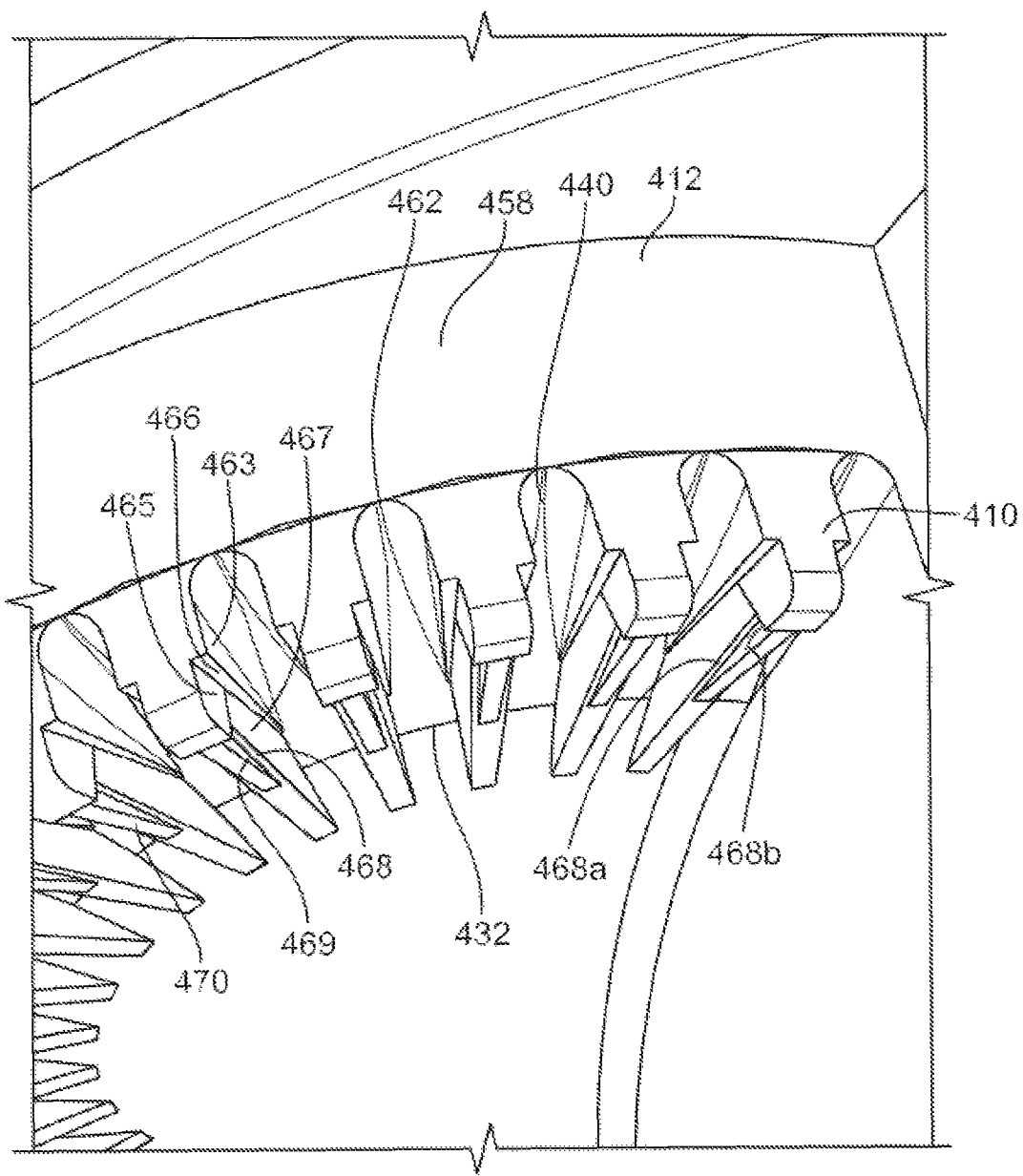
FIG. 17 is a detailed perspective view of some of the ribs on the underside of the deflector portion of the nozzle of FIG. 14.

As the ribs 410 are each generally symmetric about a radially-extending line, only one of the sides of a representative rib 410 will be described with it being understood that the opposite side of that same rib 410 has the same structure. With reference to FIG. 17, the rib 410 has a first step 466 forming in part a first micro-ramp and a second step 468 defining in part a second micro-ramp. The first step 466 is generally linear and positioned at an angle closer to perpendicular relative to a central axis of the deflector 412 as compared to the bottom 462 of the upper deflector surface 458, as shown in FIG. 17. The second step 468 is segmented, having an inner portion 468a that extends closer to perpendicular relative to the central axis as compared to an outer portion 468b, which has a sharp downward angle.

The geometries of the ribs 410 and the bottom 462 of the of the upper deflector surface 458 cooperate to define a plurality of micro-ramps which divide the discharging water into sprays having differing characteristics. More specifically, the first and second steps 466 and 468 divide the sidewall into four portions having different thicknesses; a first sidewall portion 463 disposed beneath an outward region of the bottom 462 of the upper deflector surface 458; a second sidewall portion 465 disposed beneath the first sidewall portion 463 and at the outer end of rib 410; a third sidewall portion 467 disposed beneath the first sidewall portion and radially inward from the second sidewall portion 467, and a fourth sidewall portion 469 disposed beneath the first and second sidewall portions 465 and 467, as depicted in FIG. 17. As addressed further below, these four sidewall portions result in fluid flow along the ribs 410 in multiple water streams that combine to provide relatively uniform fluid distribution.

The half-circle nozzle 400 preferably includes 16 ribs 410. These ribs 410 produce a total of 76 water streams in three sets of general flow channels having general trajectories for relatively distant (16 streams), intermediate (30 streams), and short (30 streams) ranges of coverage. More specifically, and with reference to FIG. 15, there is a distant spray A, a mid-range spray B, and a close-in spray C. However, rather than being distinct trajectories, these secondary and tertiary streams (B and C) are deflected or diffused from the sides of the relatively distant, nominal streams (A). Accordingly, this type of nozzle 400 is known as a multi-stream, multi-diffuser nozzle. Of course, the number of streams may be modified by changing the number of ribs 410.

The flow channels for the relatively distant streams (A) are formed primarily by the uppermost portion of the grooves 440 between successive ribs 410. More specifically, these streams (A) flow within the uppermost portion of the groove 440 defined by the rounded bottoms 462 at the underside of the upper deflector surface 458 and extending downwardly to the first steps 466. As can be seen in FIGS. 14-17, this uppermost portion is generally curved near the base of the groove 440, such as in the shape of an arch. There is one stream (A) between each pair of ribs 410 and between the two edge ribs 410 and the boundary wall 424, so there are 16 streams (A) for nozzle 400.

The flow channel for the mid-range spray (B) is defined generally by the side of each rib 410 between the first step 466 and the second step inner portion 468a. More specifically, these streams (B) flow within an intermediate portion of the discharge channel 440 and have a lower general trajectory than the distant streams (A). These mid-range streams (B) may be deflected laterally to some extent by the second step outer portion 468b. There is one stream (B) corresponding to the side of each rib 410, totaling 30 mid-range streams (B) for nozzle 400.

The flow channels for the close-in streams (C) are formed generally by the lowermost portion of the groove 440 on each side of rib 410. More specifically, these streams (C) flow beneath the second step 468 and along the lowermost portions of the ribs 410. These streams (C) generally have a lower trajectory than the other two streams (A and B) and impact and are directed downwardly by the second step outer portion 468b. The sharply inclined end segment 468b is configured to direct the water spray more downwardly as compared to the spray from the first micro-ramp. There is one stream (C) corresponding to the side of each rib 410, totaling 30 close-in streams (C) for nozzle 400.

As addressed above, these three general trajectories are not completely distinct trajectories. The relatively distant water stream (A) has the highest trajectory and elevation, generally does not experience interfering water streams, and therefore is distributed furthest from the nozzle 400. However, the secondary and tertiary streams (B and C) are deflected or diffused from the sides of the ribs 410, have lower general trajectories and elevations, and experience more interfering water streams. As a result, these streams (B and C) fill in the remaining pattern at intermediate and close-in ranges.

The positioning and orientation of the first and second steps 466 and 468 may be modified to change the flow characteristics. It will be understood that the geometries, angles and extend of the micro-ramps can be altered to tailor the resultant combined spray pattern. Further, while it is presently believed to be preferable to have all or nearly all of the ribs 410 with the micro-ramps, it is foreseeable that in some circumstances it may be preferable to have less than all of the ribs 410 include micro-ramps. For instance, the micro-ramps may be on only one side of each of the ribs 410, may be in alternating patterns, or in some other arrangement.

In the exemplary embodiment of a nozzle 400, the ribs 410 are spaced at about 10 degrees to about 12 degrees apart. The first step 466 is preferably triangular in shape and between about 0.004 and 0.008 inches in width at its outer end from the sidewall of the adjacent portion of the rib 410, such as about 0.006 inches. It preferably has a length of about 0.080 inches and tapers downwardly about 6 degrees from a horizontal plane defined by the top of the nozzle 400. The second step 468 may be between about 0.002 inches in width, an inner portion 468a may be about 0.05 inches in length, and an angle of the inner portion 468a may be about 2 degree relative to a horizontal plane. The angle of the bottom portion 470 of rib 410 may be about 9 degrees downwardly away from a horizontal plane coinciding with the top of the nozzle 400. While these dimensions are representative of the exemplary embodiment, they are not to be limiting, as different objectives can require variations in these dimensions, the addition or subtraction of the steps and/or micro-ramps, and other changes to the geometry to tailor the resultant spray pattern to a given objective.

Other deflector and rib feature are described in U.S. patent application Ser. No. 12/757,912, which is assigned to the assignee of the present application and which application is incorporated herein by reference in its entirety. The deflector surface disclosed in U.S. patent application Ser. No. 12/757,912 may be incorporated into the nozzle embodiments disclosed in this application. More specifically, the deflector surface and water distribution profile including rib features of that application may be used in conjunction with the inflow ports, conical transition surfaces, and other parts of the nozzle embodiments disclosed above.

Figure 18:
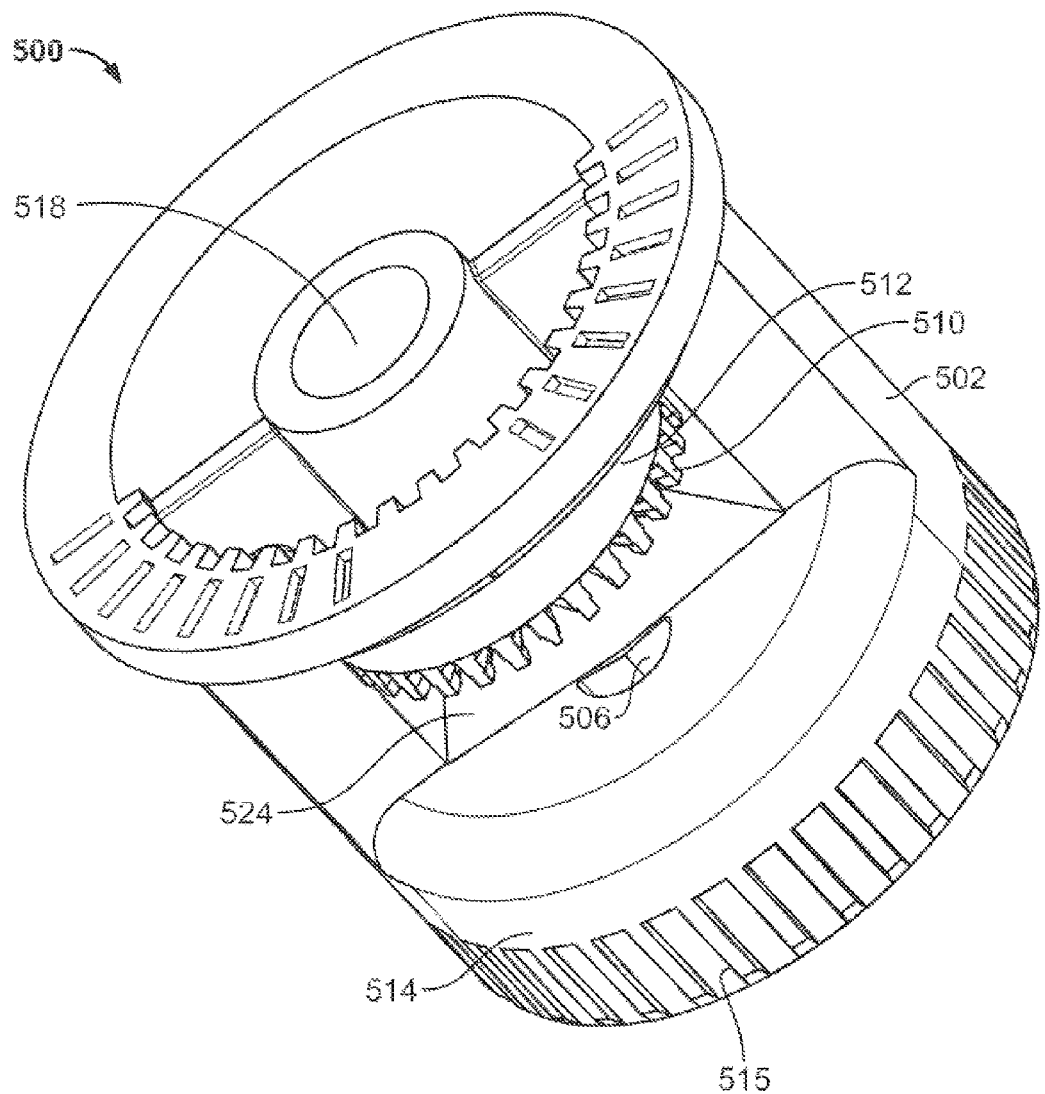
FIG. 18 is a top perspective view of a fifth embodiment of a nozzle embodying features of the present invention.
Figure 19:
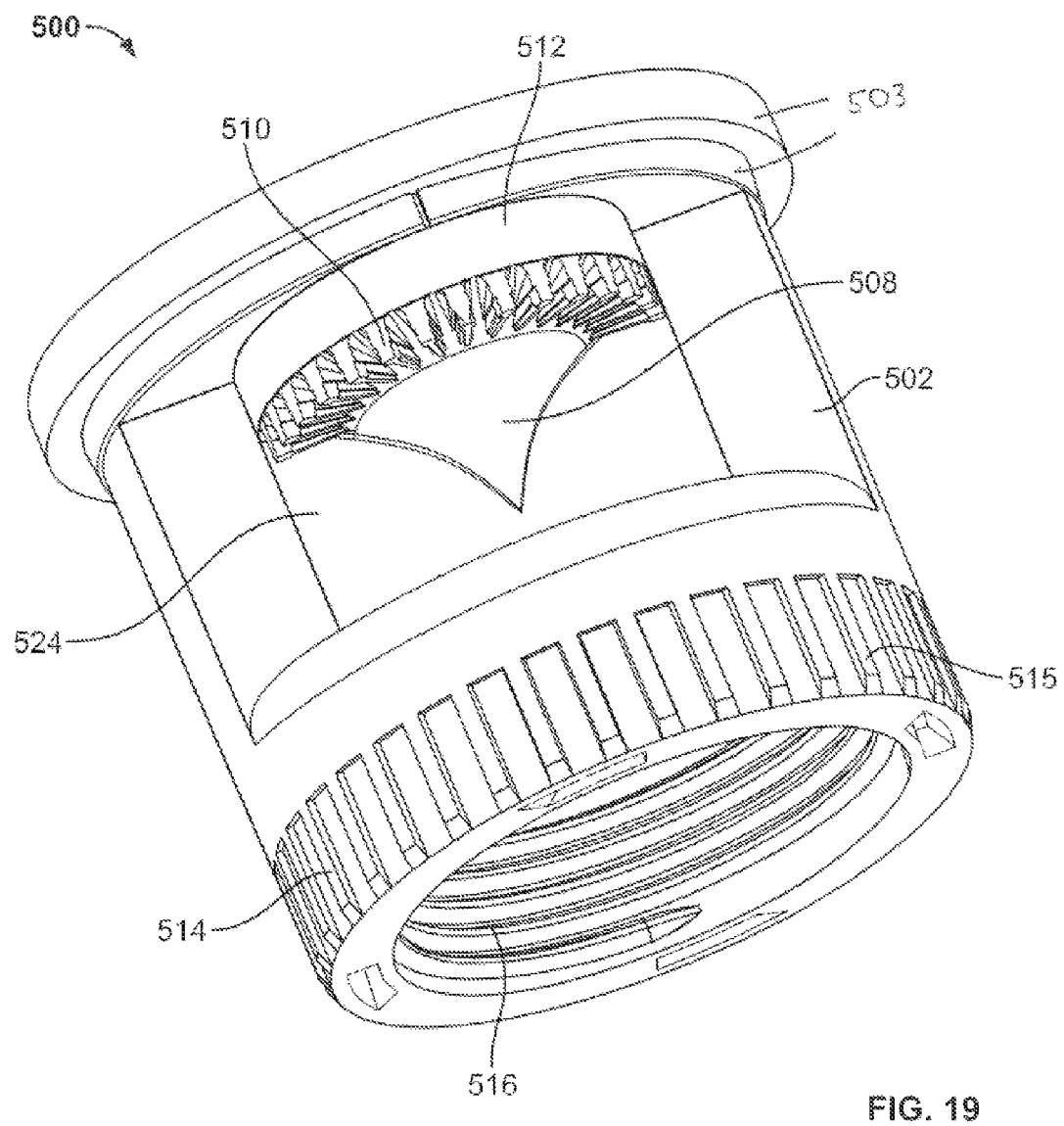
FIG. 19 is a bottom perspective view of the nozzle of FIG. 18.

Another embodiment of a multi-stream, multi-diffuser nozzle 500 is shown in FIGS. 18 and 19. The nozzle 500 has a longer intended maximum throw radius of about 15 feet. As can be seen, the 15-foot nozzle 500 has similar features and structures relative to the 8-foot nozzle 400. More specifically, the nozzle body 502, conical transition surface 508, ribs 510, deflector 512, bottom mounting end 514, central bore 518, and other structures are similar to the nozzle 400. However, although the inflow port 506 has the same general shape as inflow port 406, it is larger to accommodate a larger flow of fluid and a longer maximum throw radius. The radius of the inflow port 506 is preferably about 0.057 inches to achieve a 15-foot throw radius and a matched precipitation rate of about 0.9 inches per hour.

Figure 20:
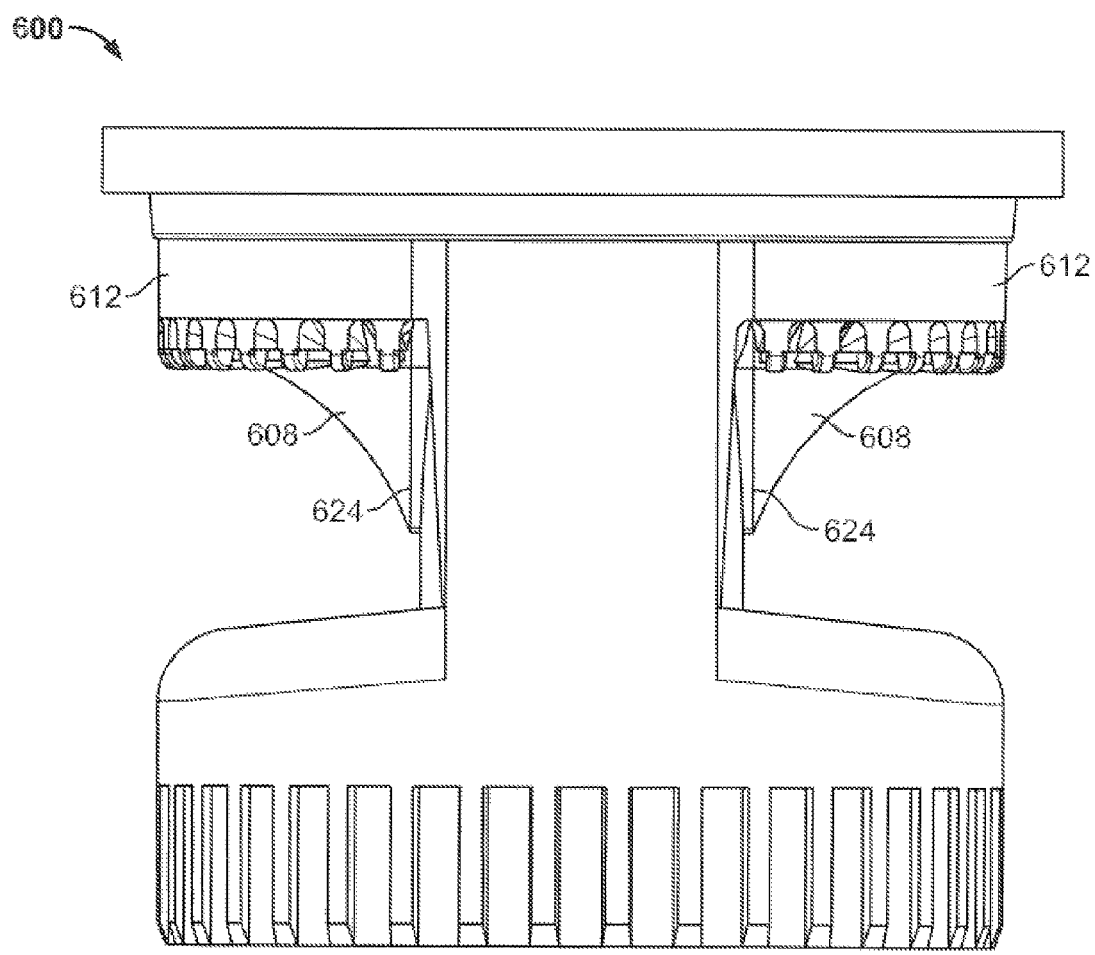
FIG. 20 is a side elevational view of a sixth embodiment of a nozzle embodying features of the present invention.
Figure 21:
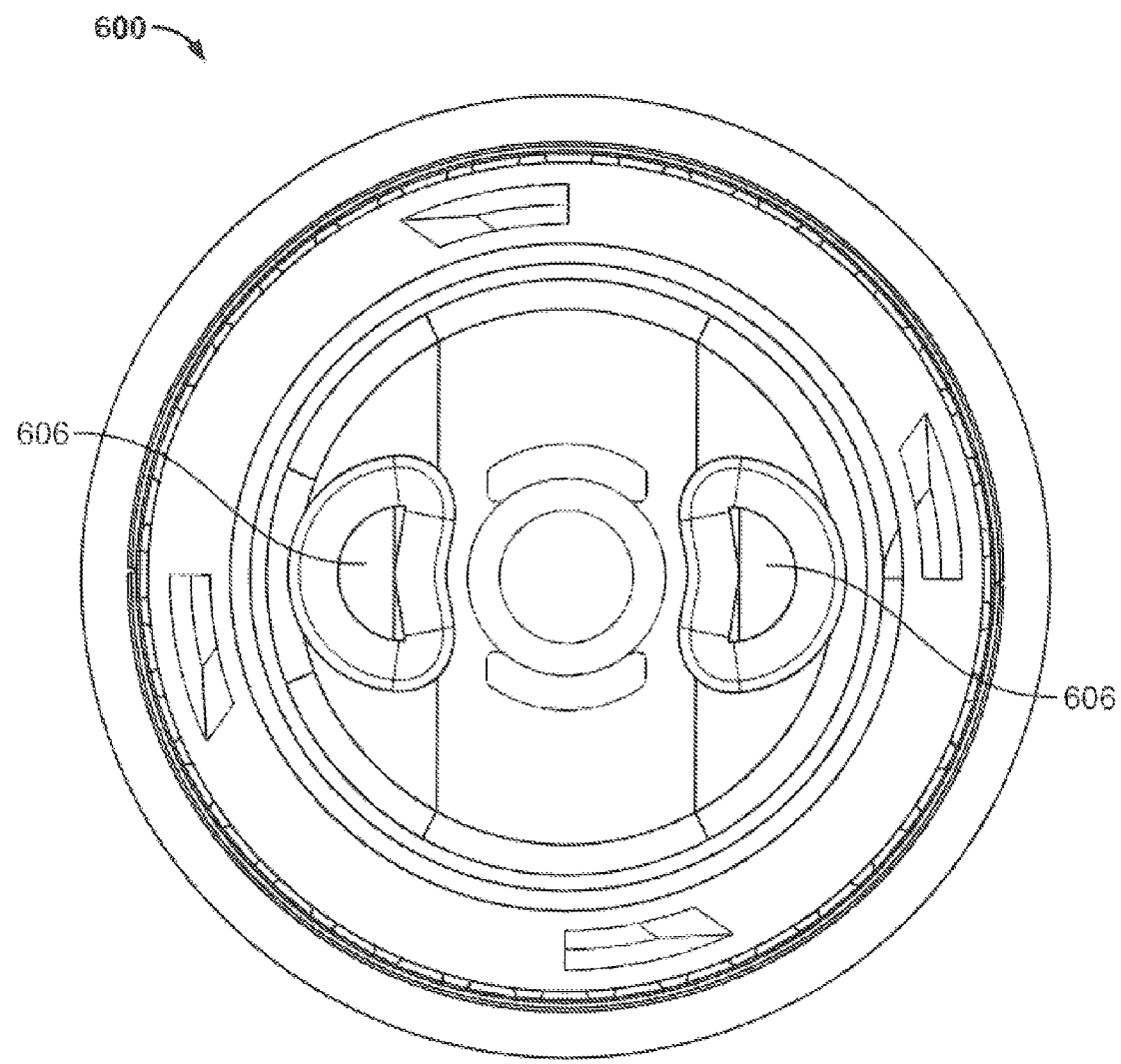
FIG. 21 is a bottom plan view of the nozzle of FIG. 18.
Figure 22:
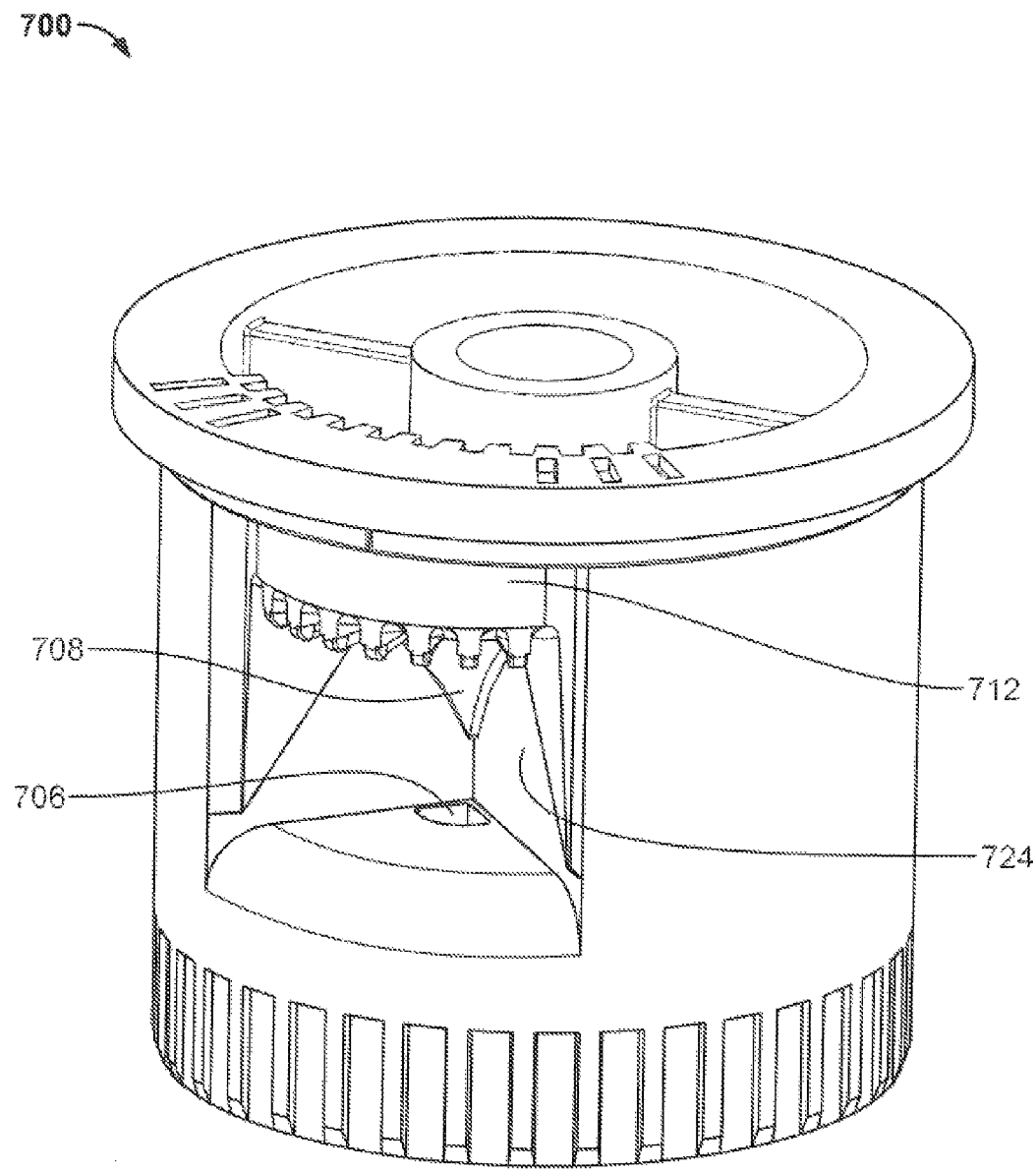
FIG. 22 is a top perspective view of a seventh embodiment of a nozzle embodying features of the present invention.
Figure 23:
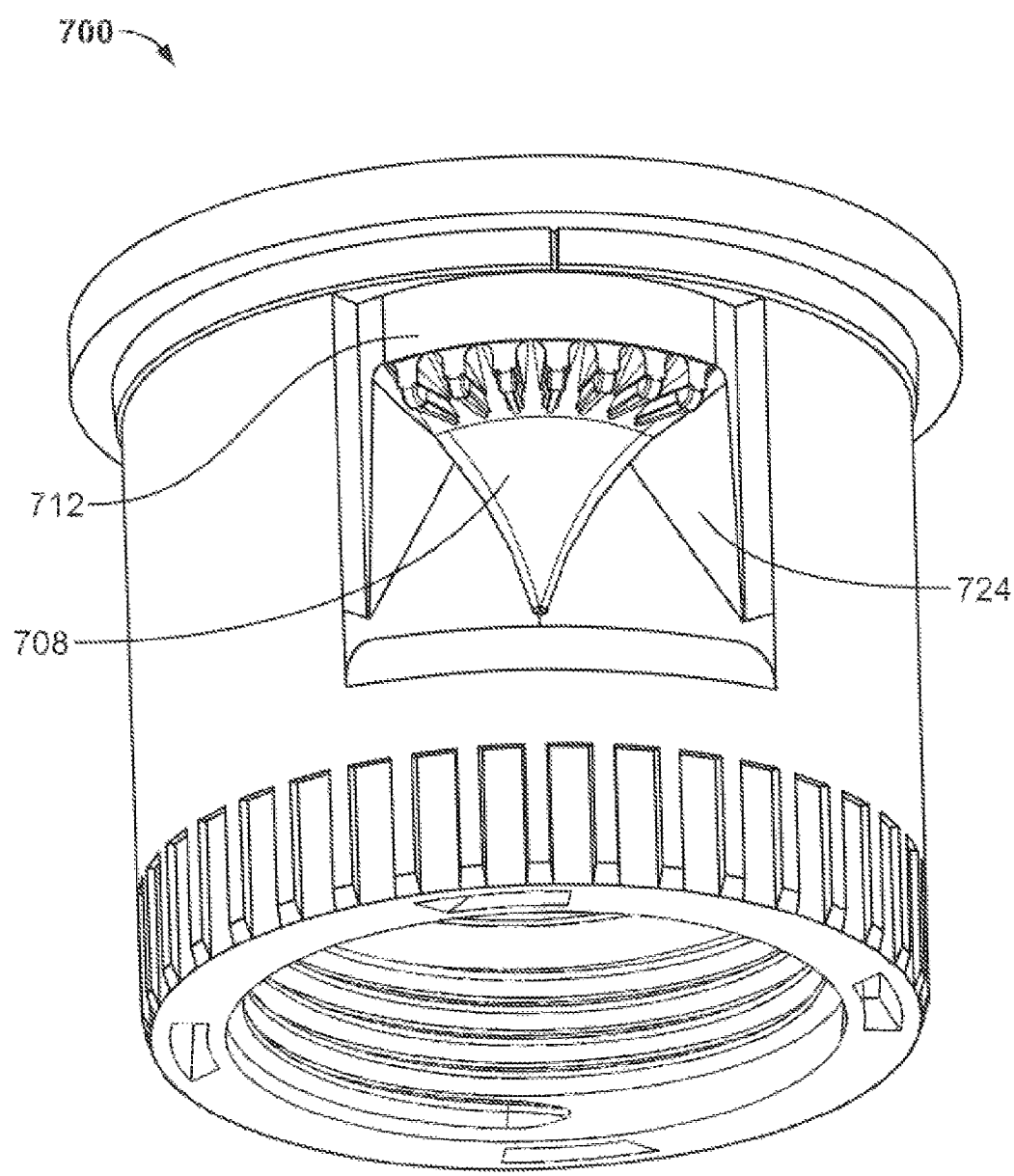
FIG. 23 is a bottom perspective view of the nozzle of FIG. 22.
Figure 24:
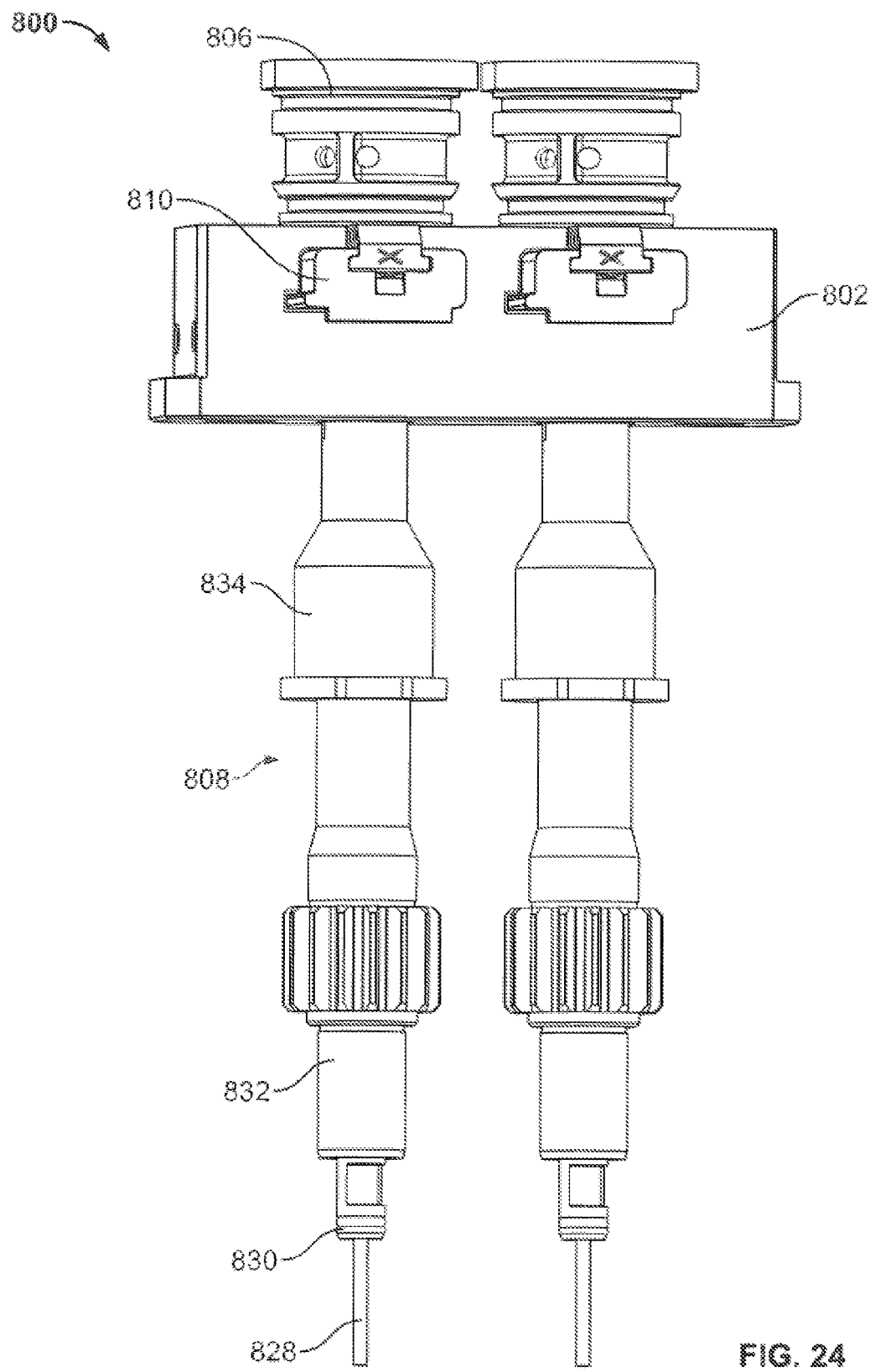
FIG. 24 is a side elevational view of a mold assembly embodying features of the present invention.

Further, although the nozzles 400 and 500 shown in FIGS. 14-19 distribute fluid in a fixed 180 degree arc, i.e., is a half-circle nozzle, the nozzle may be easily manufactured to cover other predetermined water distribution arcs. For example, in FIGS. 20-23, there are illustrated two additional embodiments 600 and 700 to achieve irrigation at different fixed arcs. FIGS. 20 and 21 show a full-circle nozzle 600 that is generally symmetrical about a planar axis. More specifically, it includes two inflow ports 606, two conical transition surfaces 608, two deflectors 612, and two boundary walls 624 that are preferably identical in shape but facing opposite directions. As another example, FIGS. 22 and 23 show a quarter-circle nozzle 700 that is formed with an inflow port 706, conical transition surface 708, deflector 712, and boundary wall 724 each defining a generally 90 degree cross-section. It should be evident that a nozzle may be fashioned covering any desired fixed arc of coverage by modifying the shape of the inflow port, conical transition surface, deflector, and boundary wall to achieve the desired fixed arc.

Generally, an arc of coverage in excess of 180 degrees can be achieved through the use of two sets of ports, conical transition surfaces, boundary walls, and deflectors. As addressed, FIGS. 20-21 show a full-circle nozzle 600 with two sets of each of these features. Near the nozzle 600, the two boundary walls 624 define two sets of water distribution edges (or a total of four edges). However, the gap between the two boundary walls 624 is preferably very small (or on the order of 0.2 or 0.3 inches) such that, even at short distances from the 15-foot nozzle 600, there is a full 360 arcuate span of coverage. Similarly, for other nozzles with two sets of features, there is no meaningful gap in coverage such that the full range of coverage from 180 to 360 degrees can be achieved with two sets of features.

For all embodiments, the flow characteristics of the fluid emitted from the nozzles may be modified by changing certain dimensions of the nozzles. For example, the radius of the inflow port may be modified to increase or decrease the precipitation rate. Also, the curvature of the conical transition surface may be abrupt to provide for more dissipation of energy when striking the deflector to decrease the throw radius. Alternatively, the curvature may be decreased to allow a more gentle transition to the deflector and less dissipation of energy. Finally, the rib surfaces, including inclination, notches within the rib surfaces, grooves separating the ribs, steps along the ribs, etc., may be modified to change the flow channels, trajectory, elevation, and distribution of water.

It is generally understood that the terrain most distant from a single nozzle receives less water than terrain closer to the nozzle. In order to improve uniformity of coverage, it is generally desirable to operate several nozzles in concert close enough to one another such that their spray patterns overlap. This overlap is intended to ensure that terrain relatively distant from an individual nozzle is sufficiently irrigated. It is contemplated that this general approach may be applied to the nozzles described herein in any of various overlapping arrangements.

Other aspects of this disclosure are a molding assembly and method for forming spray nozzles, such as those addressed herein. More specifically, the method generally involves forming a single-piece molded nozzle body that includes both a mounting portion and a deflecting portion all in one unitary body. In contrast, many other conventional nozzles require the formation and assembly of several separately molded components. By forming a single-piece nozzle in a molding process, the need for multiple molds and component assembly may be avoided such that complexity and manufacturing costs may be reduced.

FIGS. 24-29 illustrate the improved molding assembly 800 and method for making a single-piece, unitary spray nozzle body. In general, mold members designed for use in a standard injection molding machine (not shown) are movable to a closed position within a cavity block 802 defining a mold cavity 804 having a size and shape conforming to the geometry of the nozzle body to be molded. A set of retractable core units 806, 808, 810, 812 are advanced into the cavity block 802 to define the geometry of features to be formed in the nozzle body, as addressed further below. Once the core units 806, 808, 810, 812 have been advanced to their closed positions, the cavity block 802 is injected with appropriate plastic material or other suitable molding material, the plastic material hardens to form the nozzle body, and some or all of the core units 806, 808, 810, 812 may be retracted to allow the newly-formed nozzle body to be removed. This process is repeated to form additional nozzle bodies.

As shown in FIGS. 24-29, the molding assembly 800 and method make use of a cavity block 802 that serves to hold the nozzle body as it is being molded and to define the molding cavity 804. In this example, the 15-foot half-circle multi-stream, multi-trajectory nozzle body 502 (FIG. 26) is shown as being molded, although other types of unitary, one-piece nozzle bodies, such as those addressed herein, may be formed according to this process. In describing the mold assembly 800, reference is therefore made to the nozzle body 502 addressed above. In one preferred form, the cavity block 802 may have multiple internal stations to allow the simultaneous molding of two or more nozzle bodies. Here, as can be seen, the cavity block 802 shown in FIGS. 24-26 allows the molding of two nozzle bodies at the same.

For each nozzle body being molded, the cavity block 802 preferably includes windows, or openings 814, to allow the advancement of core units 806, 808, 810, 812 to the closed molding positions and to allow retraction of some or all of the core units 806, 808, 810, 812 to the open molding positions. In this preferred form, there are preferably four windows 814 in the cavity block 802 corresponding to each station (a top window, a bottom window, a front window, and a rear window) to accommodate advancement and retraction of some or all of the core units 806, 808, 810, 812. Although the terms top, bottom, front, and rear are used for the sake of illustration, it should be evident that the orientation of the cavity block 802, core units 806, 808, 810, 812, and windows 814 may be modified to suit individual needs, such as, for example, by changing the orientation of the cavity block 802 so that its "top" is a "side,"etc.

Figure 26:
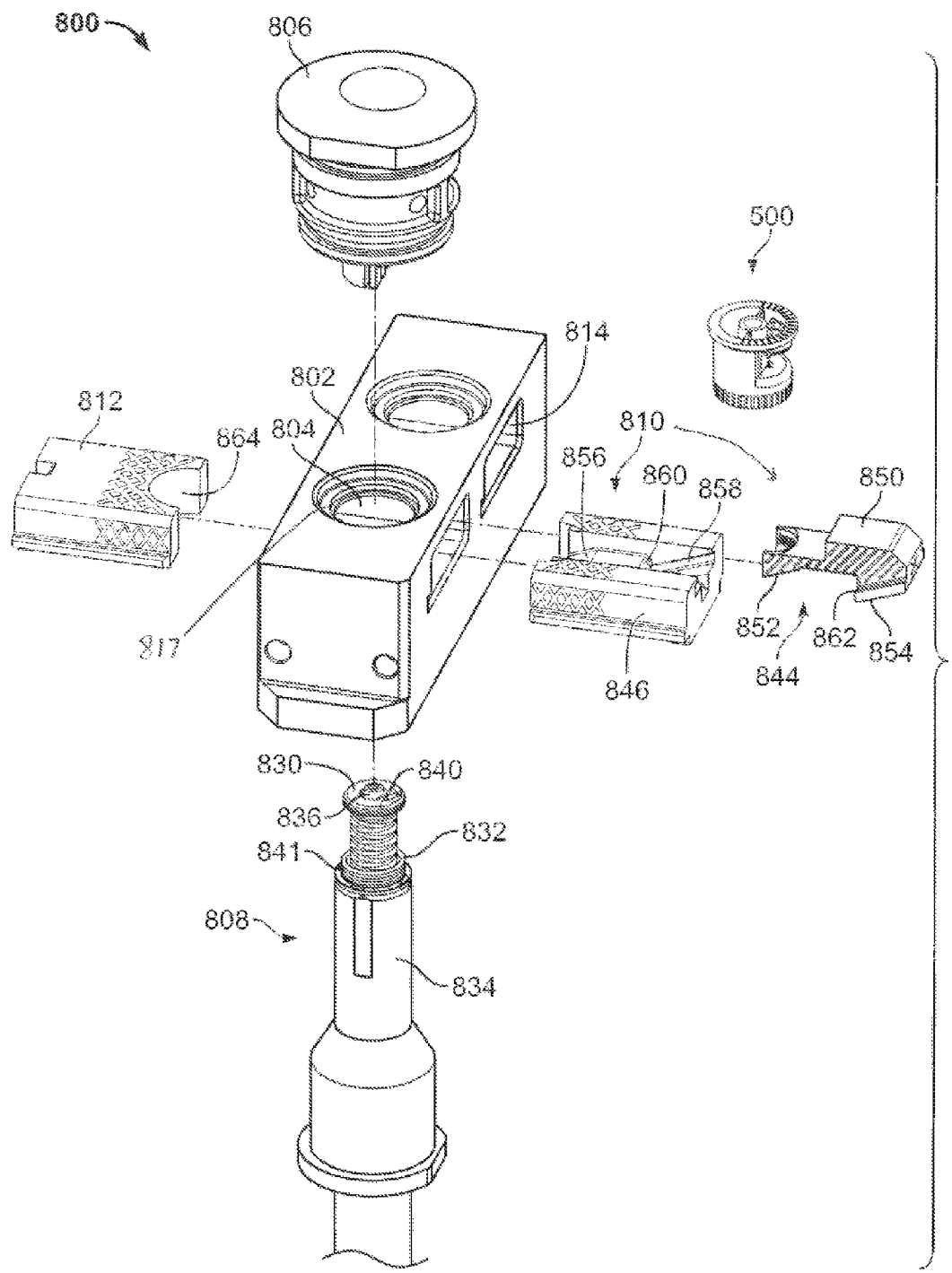
FIG. 26 is an exploded view of the cavity block and core units of the mold assembly of FIG. 24.
Figure 27:
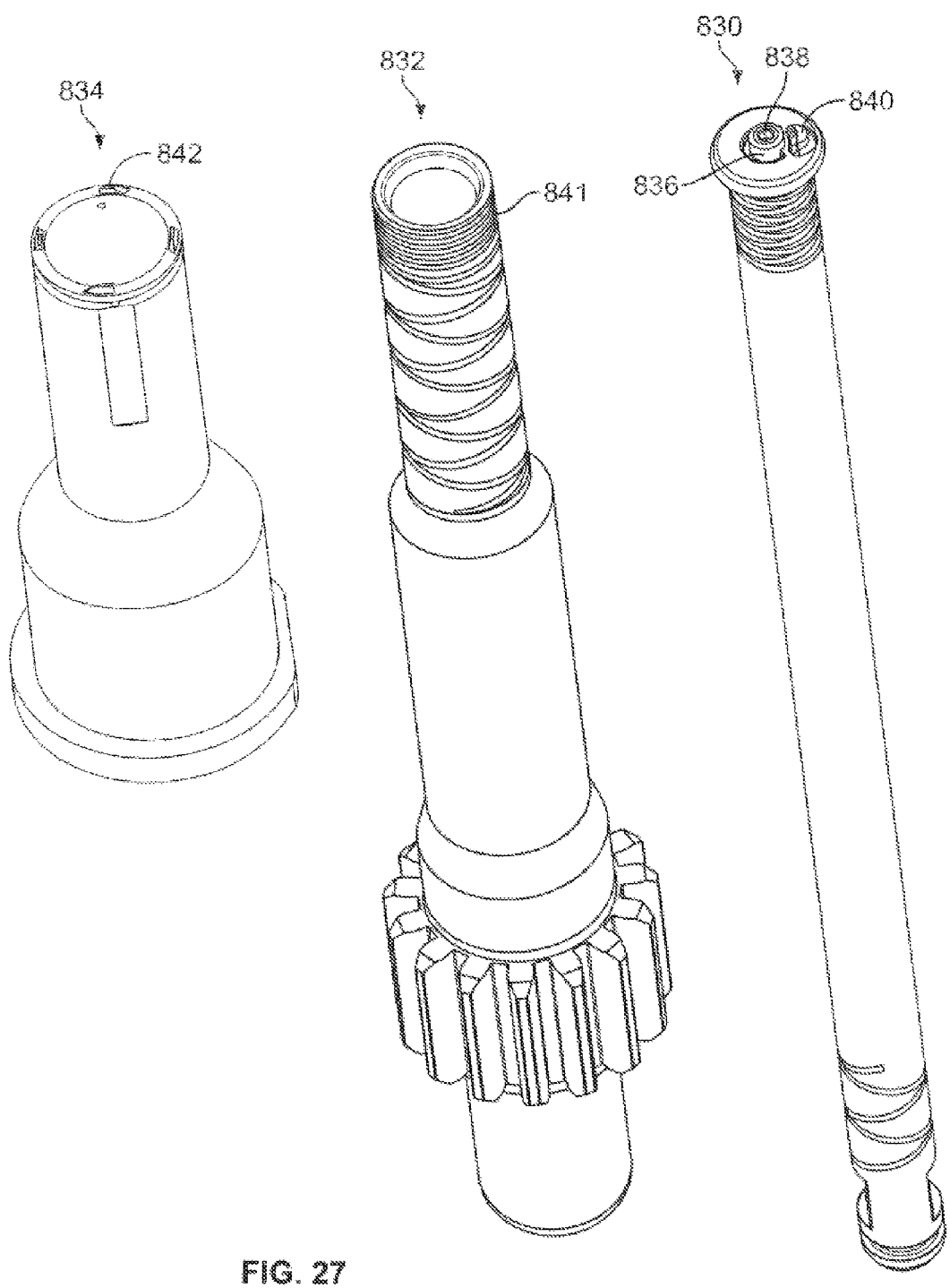
FIG. 27 is an enlarged perspective view of the top ends of the first, second, and third sleeves of the second core unit of the mold assembly of FIG. 24.

As shown in FIG. 26 and as addressed below, the cavity block 802 and core units 806, 808, 810, 812 are arranged to achieve interference-free insertion and retraction from the cavity block 802. The cavity block 802 also preferably includes knurling 816 on an internal station wall to provide a knurled surface 515 on the bottom mounting end 514 of the nozzle body 502. The cavity block 802 also includes an indented surface 817 adjacent the top window 814 to define the flanges 503 at the top end of the nozzle body 502. As addressed further, below, the core units 806, 808, 810, 812 generally include surfaces with profiles that mirror features of the nozzle body 502 to be molded.

In this preferred form, there are four core units 806, 808, 810, 812. The first or top core unit 806 advances vertically downwardly to a closed position to provide the molded features for the top end of the nozzle body 502 and generally includes structure to define the top end of the nozzle body 502. More specifically, it includes a central cylindrical post 818 with a conical protrusion 820 to define part of the central bore 518, a conical portion 822 to define a top portion of the deflector 512, and indicia (such as radial lines 824) to designate the type of nozzle and other information. The shape of the conical portion 822 may be modified to form nozzle bodies having different fixed arcs of coverage. The first core unit 806 also preferably defines a sprue or channel 826 for plastic material to be poured into the cavity block 802 when the core units 806, 808, 810, 812 are in a closed position.

Figure 25:
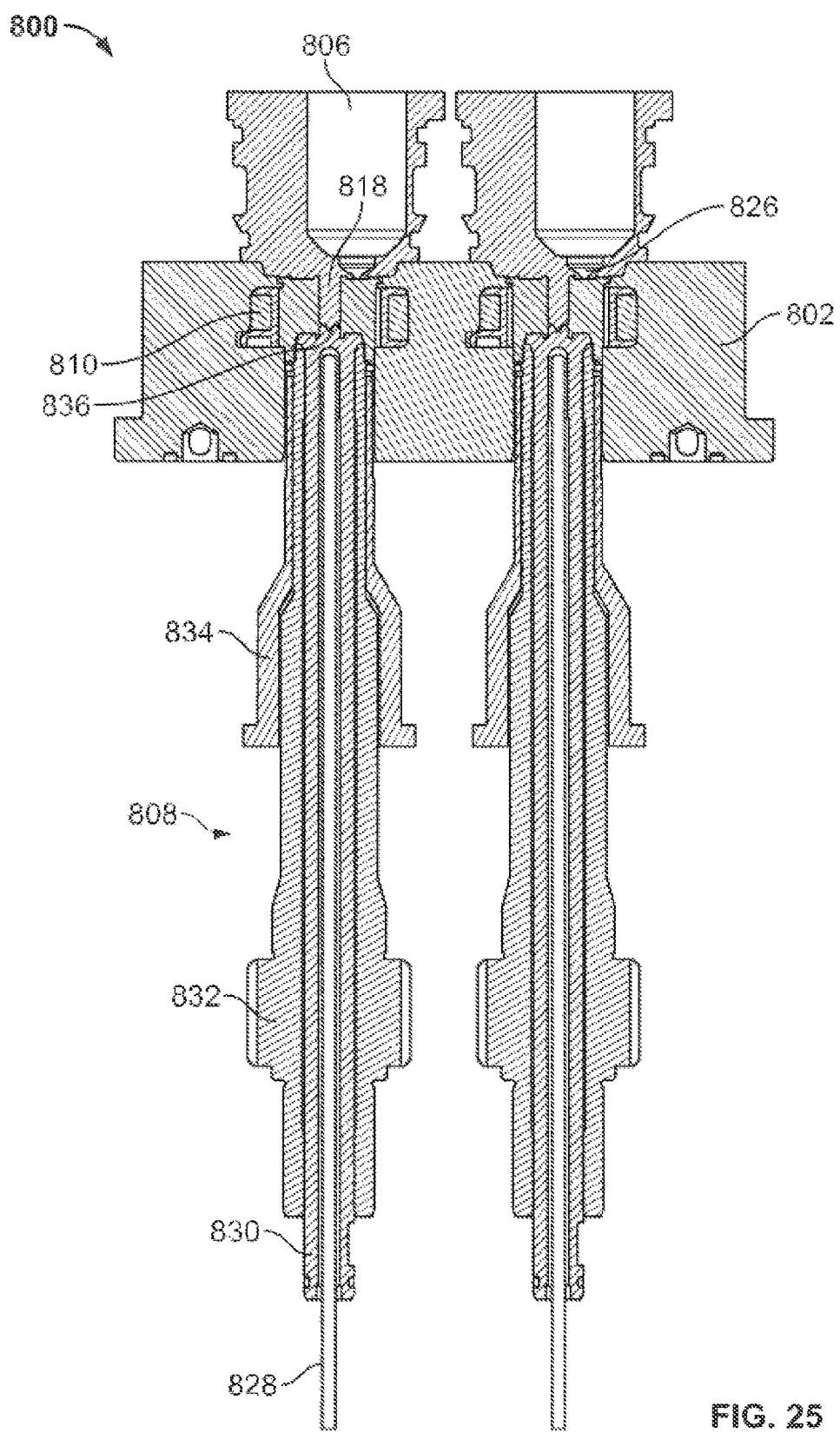
FIG. 25 is a cross-sectional view of the mold assembly of FIG. 24.

As can be seen in FIGS. 24-27, the molding process also uses a second or bottom core unit 808, which is an assembly of nested components. The second core unit 808 provides the molded features for the bottom mounting end 514 of the nozzle body 502 and generally includes structure to define the bottom end 514. The second core unit 808 preferably includes the following nested components as one proceeds outwardly from a central axis; a core pin 828, a mold core sleeve 830, a threaded core sleeve 832, and a support core sleeve 834. As can be seen in FIG. 25, in the closed position, the upper end of the mold core sleeve 830 extends upwardly beyond the upper end of the threaded core sleeve 832, which in turn extends upwardly beyond the upper end of the support core sleeve 834.

The mold core sleeve 830 defines part of the nozzle body central bore 518 and inflow port 506. The mold core sleeve 830 receives the pin 828 and, at its top end, includes a raised cylindrical button 836 that preferably engages the lower end of the central cylindrical post 818 of the first core unit 806 when both are in a closed position. The button 836 preferably includes a central depression 838 for receiving the conical protrusion 820 of the post 818. The button 836 and post 818 collectively define the central bore 518 of the nozzle body 502. The top end of the mold core sleeve 830 also includes a raised half-cylindrical boss 840 that defines the semi-circular inflow port 506 of the half-circle nozzle body 502. Of course, the shape of this raised half-cylindrical boss 840 may be changed for inflow ports of nozzle bodies having different arcs of coverage.

The threaded core sleeve 832 defines the nozzle body mounting threading 516. More specifically, the threaded core sleeve 832 has external threading 841 at its top end to define the internal threading 516 for mounting of the nozzle body 502. This threaded core sleeve 832 is preferably rotatable so that it can be disengaged from the nozzle body 502 once the molding process is completed. The support core sleeve 834 is the outermost nested component and supports the bottom of the nozzle body 502. It includes dogs 842 on its upper surface to hold the nozzle body 502 and to facilitate disengagement of the threaded core sleeve 832 from the nozzle body 502. Disengagement of the threaded core sleeve 832 is preferably coordinated with ejection of the nozzle body 502 through the top window 814 of the first core unit 806 when molding is completed. There are various conventional methods and assemblies for forming internal threads within a molded body and these methods and assemblies may also be used.

Further, although in this embodiment the threading being molded is internal threading for nozzle 500, it should be evident that the threading may be formed as external threading instead. Some risers or fluid source are equipped with internal threading at their upper end for the mounting of nozzles, and therefore, for some embodiments, the nozzle may be preferably formed with external threading. Accordingly, the second core unit 808 may be modified so as to form a nozzle having an externally threaded bottom mounting end.

Figure 28:
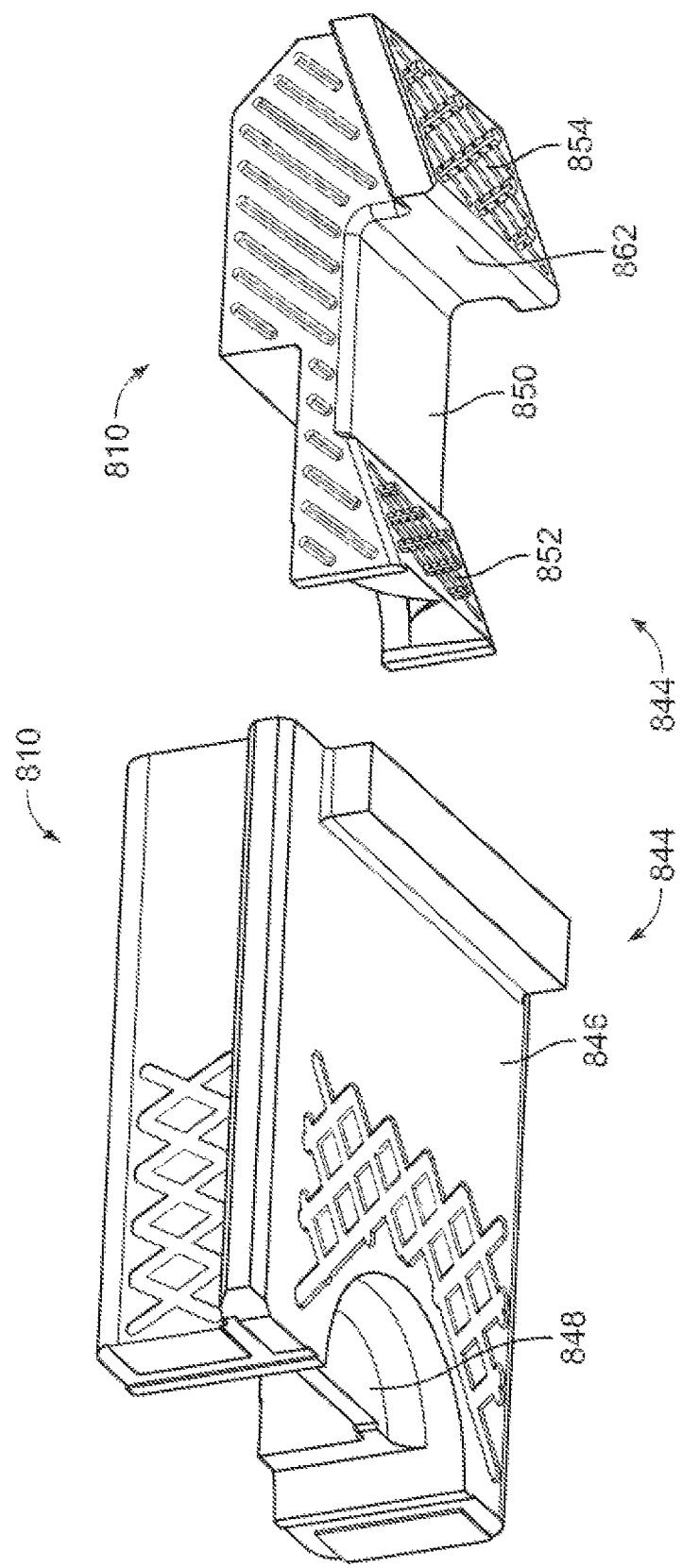
FIG. 28 is a bottom perspective view of the third core unit of the mold assembly of FIG. 24.
Figure 29:
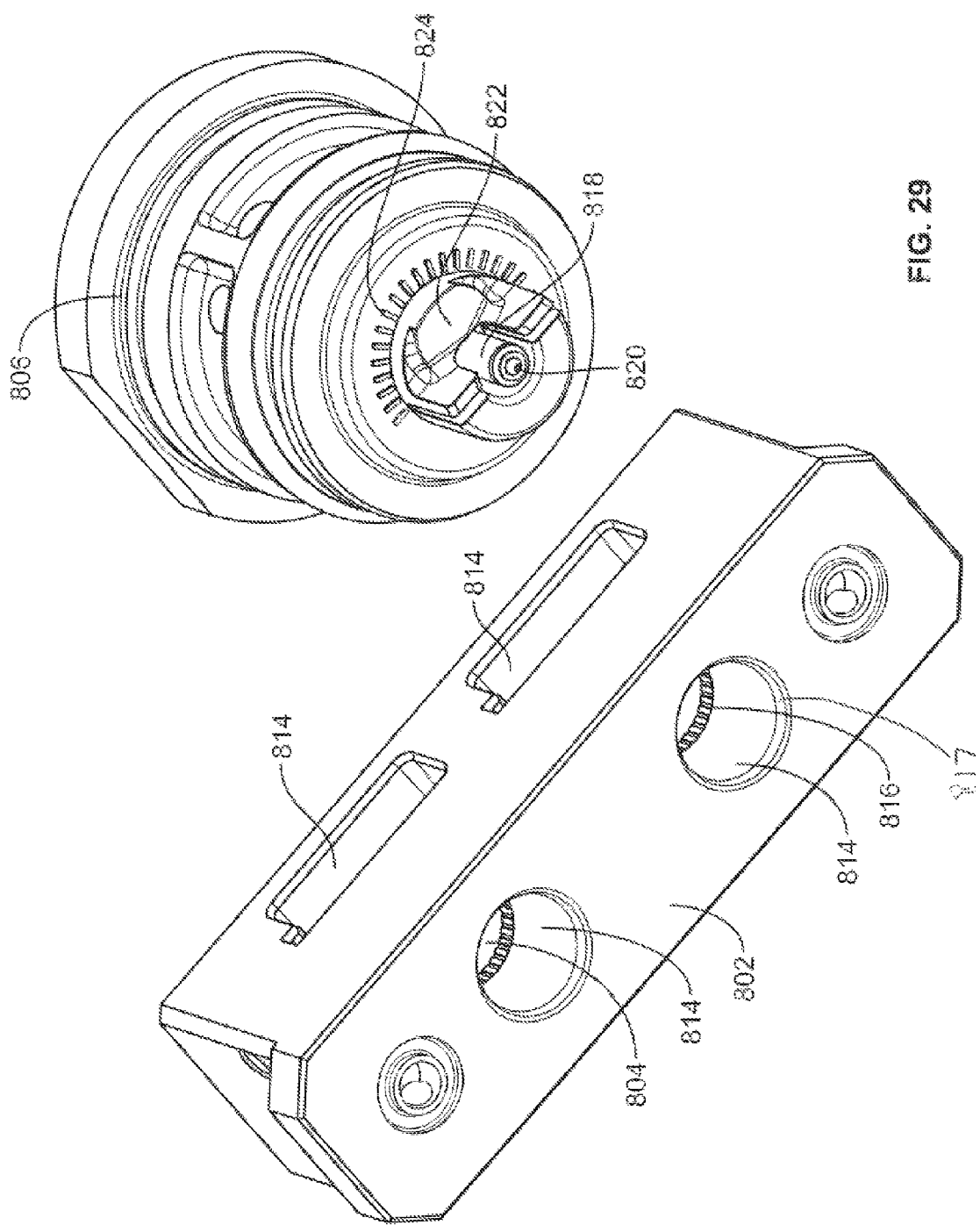
FIG. 29 is a bottom perspective view of the cavity block and first core unit of the mold assembly of FIG. 24.
Figure 30:
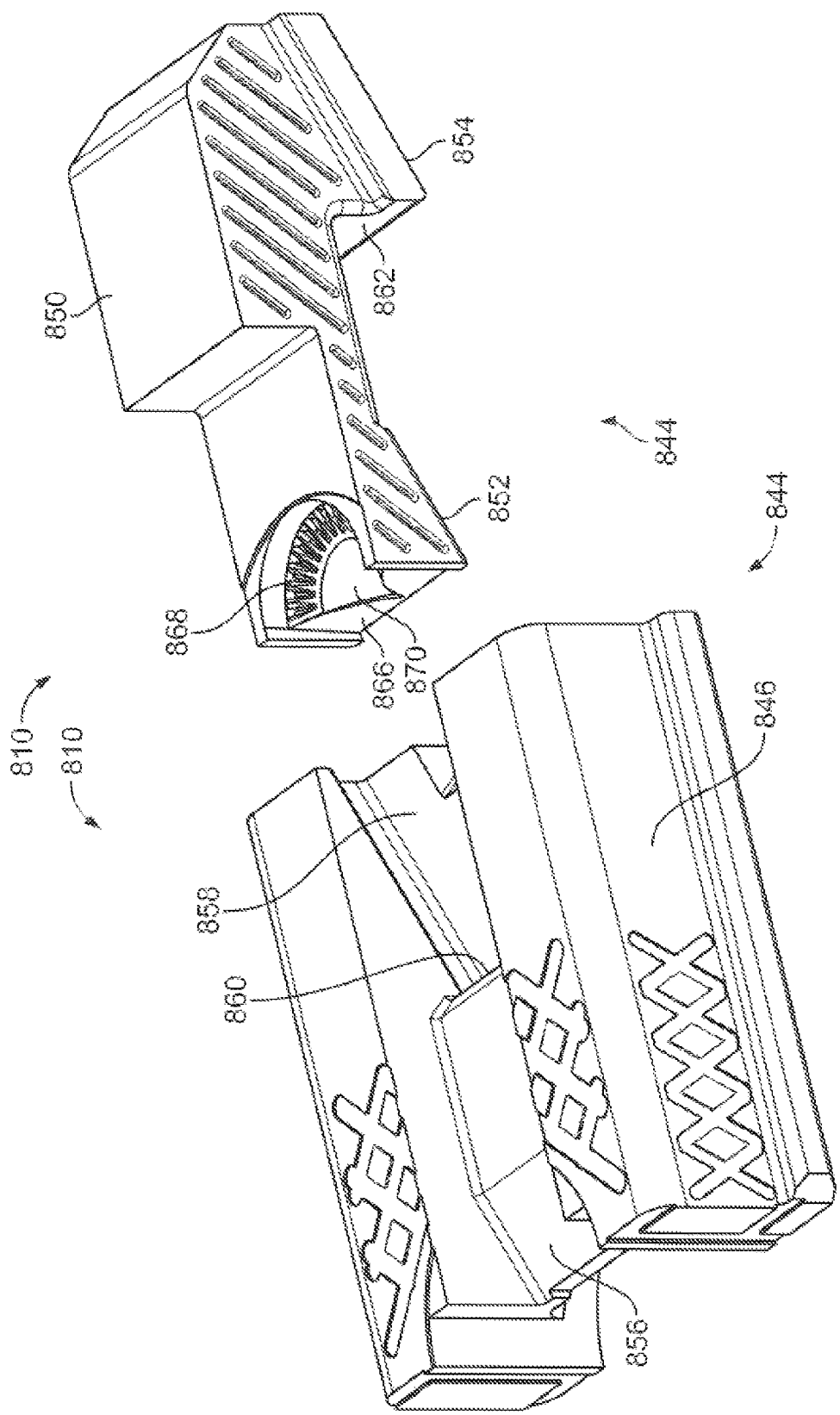
FIG. 30 is a top perspective view of the third core unit of the mold assembly of FIG. 24.

The third core unit 810 can be seen in FIGS. 26 and 28. In one preferred form, the third core unit 810 is a compound slide 844 that forms one side of the nozzle body 502 and that provides the mold structure to define part of the outer wall of the bottom mounting end 514, boundary wall 524, and underside of the deflector 512. A first slide 846 includes a half-cylindrical cut-out portion 848 to define part of the bottom mounting end 514. The second slide 850 is disposed above the first slide 846 and provides the mold structure to define part of the boundary wall 524, the underside of the deflector 512, and the transition surface 508. More specifically, as shown in FIG. 30, the second slide 850 includes a boundary wall profile 866, a rib structure profile 868, and a transition surface profile 870 that mirror the corresponding features of the nozzle body 502.

As should be evident, the first and second slides 846 and 850 may be modified to form nozzle bodies having other fixed arcs of coverage, such as those described above. Further, as should be evident, the second slide 850 may be modified to accommodate the water distribution profile, including number of ribs, grooves, notches, and steps of different deflector types, such as the various deflectors 112, 212, 312, 412, 512, 612, and 712 addressed above.

The first and second slides 846 and 850 are preferably in sliding engagement with respect to one another. More specifically, following completion of the molding process, the first slide 846 is retracted first and slides beneath the second slide 850 an initial distance without causing the second slide 850 to move laterally. The second slide 850 includes two inclined surfaces 852 and 854 that ride along two corresponding inclined surfaces 856 and 858 of the first slide 846. As the first slide 846 is initially retracted, the inclined surfaces 852, 854, 856, 858 allow the second slide portion defining the water distribution profile with rib features to initially move downwardly away from the molded rib features so as not to break or distort these molded features. In other words, the second slide 850 moves vertically downward to clear the fine rib features before it is moved laterally. Once the first slide 846 has been retracted the initial distance, a wall 860 of the first slide 846 engages a corresponding wall 862 of the second slide 850 to cause the first and second slides 846 and 850 to move together and to cause lateral retraction of the second slide 850.

Accordingly, the third core unit 810 includes a compound slide 844 having a first slide 846 and a second slide 850 having a surface with a profile that mirrors at least in part the deflector and the deflector's water distribution profile. Further, the first and second slides 846 and 850 each have a wall 860 and 862 and each have guide surfaces 852, 854, 856, 858 inclined relative to the first and second slides 846 and 850. The first slide guide surfaces 856 and 858 slide relative to the second slide guide surfaces 852 and 854 upon initial retraction of the first slide 846 from the advanced position to allow the first slide 846 to move relative to the second slide 850 with the walls 860 and 862 engaging one another at a certain distance from the advanced position to allow the first and second slides 846 and 850 to move together relative to the mold cavity 804. the first slide wall 860 is moveable to at least three positions, a first position for molding in the advanced position, a second position disengaged from the second slide wall 862 and in which the second slide 850 is disengaged from the deflector 512, and a third position in which the first and second slide walls 860 and 862 engage one another.

The fourth core unit 812 defines the other side of the nozzle body 502 and is shown in FIG. 26. For the half-circle nozzle body 502, the fourth core unit 812 simply includes a half-cylindrical cut-out blank 864 to define part of the cylindrical outer wall of the nozzle body 502. As should be evident, the mold structure of this fourth core unit 812 may be modified to achieve different nozzle body types. For example, for a full-circle nozzle body (such as nozzle 600), the fourth core unit 812 would be the same as the third core unit 810 described above (compound slide 844) in order to achieve oppositely-facing boundary walls and deflector surfaces.

Another aspect of this disclosure is a method of molding a unitary, one-piece spray nozzle body, such as a nozzle body having some of the features of nozzle body 502, using the above-described mold assembly. The method generally involves: forming a cavity block defining in part a mold cavity and having a plurality of openings; inserting a first core unit having a first surface with a profile to mirror the top of the nozzle body through a first opening in the cavity block; inserting a second core unit having a second surface with a profile to mirror the bottom end mounting portion of the nozzle body through a second opening in the cavity block; inserting a third core unit having a third surface with a profile to mirror at least in part the at least one deflector profile through a third opening in the cavity block; injecting plastic material into the mold cavity to form the nozzle body; and retracting at least two of the core units from the cavity block. The method may use some or all of the characteristics of the mold assembly addressed above.

It will be understood that various changes in the details, materials, and arrangements of parts and components which have been herein described and illustrated in order to explain the nature of the nozzle may be made by those skilled in the art within the principle and scope of the nozzle and the flow control device as expressed in the appended claims. Furthermore, while various features have been described with regard to a particular embodiment or a particular approach, it will be appreciated that features described for one embodiment also may be incorporated with the other described embodiments.

What is claimed is:

1. A nozzle comprising:
a nozzle body defining a mounting portion, at least one deflector, and a base surface facing the at least one deflector and defining at least one port, the mounting portion defining an inlet, the at least one port reducing fluid flowing through the nozzle body from the inlet to a predetermined precipitation rate, and the at least one deflector contoured to deliver fluid radially outwardly from the nozzle through a predetermined arcuate span; and
a recess extending radially between the at least one deflector and the base surface;
wherein the base surface is spaced upstream of the at least one deflector;
wherein the at least one port comprises:
at least one opening formed independent of the at least one deflector and with a cross-sectional shape corresponding to the shape of the predetermined arcuate span; and
a bore upstream of the at least one opening and oriented to guide fluid from the at least one opening across at least a portion of the recess towards the at least one deflector.

2. A nozzle comprising:
a nozzle body defining a mounting portion, at least one port, and at least one deflector, the mounting portion defining an inlet, the at least one port reducing fluid flowing through the nozzle body from the inlet to a predetermined precipitation rate, and the at least one deflector contoured to deliver fluid radially outwardly from the nozzle through a predetermined arcuate span;
wherein the at least one deflector comprises a surface having a profile forming part of the deflector and wherein the profile includes at least two sets of flow channels that subdivide fluid into a plurality of fluid streams with at least two different elevations;
wherein the nozzle body comprises at least one transition surface intermediate of the at least one port and the profile guiding flow directed through the at least one port to the at least two sets of flow channels, the at least one transition surface aligned with and expanding smoothly in the direction of the profile.

3. The nozzle of claim 2 wherein the at least one transition surface is generally conical in shape having a vertex directed to the at least one port expanding into smoothly curved sides having increasing curvature in the direction of the at least one deflector.

4. The nozzle of claim 1 wherein the at least one port is configured to provide a predetermined precipitation rate of fluid through the nozzle body less than or equal to one inch per hour.

5. The nozzle of claim 2 wherein the at least one port comprises an opening with a cross-sectional shape corresponding to the shape of the predetermined arcuate span.

6. The nozzle of claim 2 comprising two ports, two transition surfaces, and two deflectors delivering fluid through a predetermined arcuate span greater than 180 degrees.

7. The nozzle of claim 1 wherein the nozzle body further comprises at least one boundary wall defining edges of the predetermined arcuate span.

8. The nozzle of claim 2 wherein the at least one deflector and the at least one transition surface each have a shape corresponding to the predetermined arcuate span.

9. The nozzle of claim 1 wherein the at least one deflector includes a plurality of ribs arranged radially to define at least two sets of flow channels, one set having a first elevation defined by a first set of grooves between successive ribs and the second set having a second different elevation defined by a second set of grooves of a predetermined depth formed within at least one rib.

10. The nozzle of claim 9 wherein the plurality of ribs define a third set of flow channels, the third set having a third elevation defined by a third set of grooves formed within at least one rib having a different predetermined depth than the second set of grooves, the third elevation being different from the first and second elevations.

11. The nozzle of claim 9 wherein the plurality of ribs define a third set of flow channels, the third set having a third elevation defined by a bottom edge of at least one rib.

12. The nozzle of claim 1 wherein the at least one deflector includes a plurality of ribs arranged radially to define at least two sets of flow channels, one set having a first elevation defined by grooves between successive ribs and the second set having a second different elevation defined by a first step formed at least partially along the length of at least one rib.

13. The nozzle of claim 12 wherein the plurality of ribs define a third set of flow channels, the third set having a third elevation defined by a second step formed at least partially along the length of at least one rib and the third elevation being different from the first and second elevations.

14. The nozzle of claim 1 wherein the nozzle body defines a bore therethrough, the bore receiving a flow throttling screw that may be advanced toward the inlet to reduce the flow rate through the nozzle and that may be withdrawn away from the inlet to increase the flow rate through the nozzle.

15. A nozzle comprising:
a nozzle base including a mounting portion defining an inlet; and a nozzle cap in mating engagement with the nozzle base, the nozzle cap comprising:
at least one port reducing fluid flowing through the nozzle body from the inlet to a predetermined precipitation rate;
at least one deflector contoured to deliver fluid radially outwardly from the nozzle through a predetermined arcuate span, the at least one deflector comprising a surface having a profile forming part of the at least one deflector and wherein the profile includes at least two sets of flow channels that subdivide fluid into a plurality of fluid streams with at least two different elevations; and
at least one transition surface intermediate of the at least one port and the profile guiding flow directed through the at least one port to the at least two sets of flow channels, the at least one transition surface aligned with and expanding smoothly in the direction of the profile.

16. The nozzle of claim 15 wherein one of the nozzle base and the nozzle cap comprises a plurality of bores for receiving a corresponding plurality of posts of the other of the nozzle base and the nozzle cap.

17. The nozzle of claim 16 wherein one of the plurality of posts in conjunction with the corresponding bore defines the shape of the at least one port, the shape of the at least one port corresponding to the shape of the predetermined arcuate span.

18. The nozzle of claim 15 comprising two ports, two transition surfaces, and two deflectors delivering fluid through a predetermined arcuate span greater than 180 degrees.

19. A mold assembly for making a spray nozzle body having a bottom end with a mounting portion defining an inlet and at least one deflector contoured to deliver fluid radially outwardly from the nozzle body through a predetermined arcuate span and at least one port, the at least one deflector comprising a profile including at least two sets of flow channels that subdivide fluid into a plurality of fluid streams with at least two different elevations, the at least one port comprising at least one opening with a cross-sectional shape corresponding to the shape of the predetermined arcuate span, the mold assembly comprising:
a cavity block defining in part a mold cavity and having a plurality of openings;
a first core unit having a first surface with a profile to mirror the top of the nozzle body and moveable through one opening between an advanced position protruding into the cavity block and a retracted position substantially withdrawn from the cavity block;
a second core unit having a second surface with a profile to mirror the bottom end mounting portion of the nozzle body and configured for insertion through a second opening; and
a third core unit having a third surface with a profile to mirror at least in part the at least one deflector profile and moveable through a third opening between an advanced position protruding into the cavity block and a retracted position substantially withdrawn from the cavity block.

20. The mold assembly of claim 19 wherein the first core unit comprises a post for defining in part a central bore of the body.

21. The mold assembly of claim 19 wherein the second core unit comprises a threaded core sleeve for defining threading of the body.

22. The mold assembly of claim 19 wherein the second core unit comprises a mold core sleeve for defining the at least one port of the nozzle body.

23. The mold assembly of claim 22 wherein the third core unit further comprises a fourth surface with a profile to mirror a transition surface intermediate of the at least one port and the profile, the transition surface guiding flow directed through the at least one port to the at least two sets of flow channels, the transition surface aligned with and expanding smoothly in the direction of the profile.

24. The mold assembly of claim 19 wherein the third core unit comprises a compound slide having a first slide and a second slide, the second slide including the third surface with a profile to mirror at least in part the at least one deflector profile.

25. The mold assembly of claim 24 wherein the first and second slides each have a wall and a guide surface, wherein the guide surfaces slide relative to one another upon initial retraction of the first slide from the advanced position to allow the first slide to move relative to the second slide and wherein the walls engage at a predetermined distance from the advanced position to allow the first and second slides to move together relative to the mold cavity.

26. The mold assembly of claim 25 wherein the first slide wall is moveable between at least three positions, a first position for molding in the advanced position, a second position disengaged from the second slide wall and in which the second slide is disengaged from the profile, and a third position in which the first and second slide walls engage one another.

27. The mold assembly of claim 19 further comprising a fourth core unit defining in part the body and moveable through a fourth opening between an advanced position protruding into the cavity block and a retracted position substantially withdrawn from the cavity block.

28. A method of forming a molded, unitary, one-piece spray nozzle body having a bottom end with a mounting portion defining an inlet and at least one deflector contoured to deliver fluid radially outwardly from the nozzle body through a predetermined arcuate span and at least one port, the at least one deflector comprising a profile including at least two sets of flow channels that subdivide fluid into a plurality of fluid streams with at least two different elevations, the at least one port comprising at least one opening with a cross-sectional shape corresponding to the shape of the predetermined arcuate span, the method comprising:
   forming a cavity block defining in part a mold cavity and having a plurality of openings;
   inserting a first core unit having a first surface with a profile to mirror the top of the nozzle body through a first opening in the cavity block;
   inserting a second core unit having a second surface with a profile to mirror the bottom end mounting portion of the nozzle body through a second opening in the cavity block;
   inserting a third core unit having a third surface with a profile to mirror at least in part the at least one deflector profile through a third opening in the cavity block;
   injecting plastic material into the mold cavity to form the nozzle body; and
   retracting at least two of the core units from the cavity block.

29. The method of claim 28 wherein the second core unit comprises a threaded core sleeve for defining threading of the body.

30. The method of claim 28 wherein the second core unit comprises a mold core sleeve for defining the at least one port of the nozzle body.

31. The method of claim 30 wherein the third core unit further comprises a fourth surface with a profile to mirror a transition surface intermediate of one port and the at least one deflector profile, the transition surface guiding flow directed through the one port to the at least two sets of flow channels, the transition surface aligned with and expanding smoothly in the direction of the at least one deflector profile.

32. The method of claim 28 wherein the third core unit comprises a compound slide for defining in part the deflector of the body.

33. The method of claim 28 further comprising inserting a fourth core unit to define in part the body through a fourth opening in the cavity block.

* * * * *